United States Patent
Bodén et al.

(10) Patent No.: US 10,874,959 B2
(45) Date of Patent: Dec. 29, 2020

(54) FILTER INSERT AND A FILTER ARRANGEMENT

(71) Applicant: VOLVO TRUCK CORPORATION, Gothenburg (SE)

(72) Inventors: Roger Bodén, Kungsbacka (SE); Claes Frennfelt, Torslanda (SE); David Norén, Hindås (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 11 days.

(21) Appl. No.: 15/761,437

(22) PCT Filed: Sep. 23, 2015

(86) PCT No.: PCT/EP2015/071880
§ 371 (c)(1),
(2) Date: Mar. 20, 2018

(87) PCT Pub. No.: WO2017/050367
PCT Pub. Date: Mar. 30, 2017

(65) Prior Publication Data
US 2019/0046903 A1    Feb. 14, 2019

(51) Int. Cl.
*B01D 35/153* (2006.01)
*F01M 1/10* (2006.01)
(Continued)

(52) U.S. Cl.
CPC ............. *B01D 29/21* (2013.01); *B01D 29/54* (2013.01); *B01D 29/96* (2013.01); *B01D 35/153* (2013.01);
(Continued)

(58) Field of Classification Search
CPC ........ B01D 29/21; B01D 29/54; B01D 29/96; B01D 35/16; B01D 35/153;
(Continued)

(56) References Cited

U.S. PATENT DOCUMENTS 5,698,098 A    12/1997  Ernst et al.
6,045,013 A    4/2000   Yang
(Continued)

FOREIGN PATENT DOCUMENTS

CN    102633224 A    8/2012
CN    103861343 A    6/2014
(Continued)

OTHER PUBLICATIONS

International Search Report (dated Jun. 7, 2016) for corresponding International App. PCT/EP2015/071880.
(Continued)

*Primary Examiner* — Madeline Gonzalez
(74) *Attorney, Agent, or Firm* — Venable LLP; Jeffri A. Kaminski

(57) ABSTRACT

A filter insert for being removably arranged in a filter housing defines a first end and a second end opposite the first end, including a closing arrangement at the first end of the filter insert for controlling opening and closing, respectively, of an aperture, and an actuation arrangement operatively connected to the closing arrangement for actuating the closing arrangement, wherein the actuation arrangement is positioned at the second end of the filter insert and wherein the actuation arrangement is accessible for external contact at the second end of the filter insert.

22 Claims, 29 Drawing Sheets

(51) Int. Cl.
*F01M 11/03* (2006.01)
*B01D 29/21* (2006.01)
*B01D 29/54* (2006.01)
*B01D 29/96* (2006.01)
*B01D 35/16* (2006.01)

(52) U.S. Cl.
CPC ............... *B01D 35/16* (2013.01); *F01M 1/10* (2013.01); *F01M 11/03* (2013.01); *B01D 2201/0415* (2013.01); *B01D 2201/12* (2013.01); *B01D 2201/24* (2013.01); *B01D 2201/295* (2013.01); *B01D 2201/305* (2013.01); *B01D 2201/4007* (2013.01); *B01D 2201/4015* (2013.01); *B01D 2201/4046* (2013.01); *B01D 2201/4076* (2013.01); *F01M 2001/1057* (2013.01)

(58) Field of Classification Search
CPC .... B01D 2201/4076; B01D 2201/4046; B01D 2201/4015; B01D 2201/4007; B01D 2201/305; B01D 2201/295; B01D 2201/24; B01D 2201/12; B01D 2201/0415; B01D 35/00; B01D 2201/40; B01D 2201/301; B01D 2201/4061; B01D 2201/307; B01D 2201/291; F01M 1/10; F01M 11/03; F01M 2001/1057

USPC ....... 210/435, 441–444, 248, 232, 447, 282, 210/450, 493.2
See application file for complete search history.

(56) References Cited

U.S. PATENT DOCUMENTS

| | | |
|---|---|---|
| 6,311,877 B1 | 11/2001 | Yang |
| 6,572,768 B1 | 6/2003 | Cline et al. |
| 7,862,717 B2 | 1/2011 | Pfitzer et al. |
| 2015/0246303 A1* | 9/2015 | Ben-Shimon ......... B01D 35/30 210/248 |

FOREIGN PATENT DOCUMENTS

| | | |
|---|---|---|
| DE | 202005002955 U1 | 7/2006 |
| DE | 102013202449 A1 | 8/2014 |
| EP | 2181747 A1 | 5/2010 |
| WO | 2008134494 A1 | 11/2008 |

OTHER PUBLICATIONS

International Preliminary Report on Patentability (dated Jan. 10, 2018) for corresponding International App. PCT/EP2015/071880.
Chinese Office Action and Search Report dated Feb. 3, 2020 in corresponding CN Application No. 201580083271.0, 15 pages.

* cited by examiner

FILTER INSERT AND A FILTER ARRANGEMENT

BACKGROUND AND SUMMARY

The invention relates to a filter insert and a filter arrangement for cleaning a fluid. More specifically, the filter insert and filter arrangement are adapted for cleaning a fluid for an internal combustion engine, wherein the fluid may be a liquid such as a lubricating oil or fuel or a gas such as air. Such filters may be provided onboard vehicles and in other applications containing transport systems to remove unwanted solids or other contaminants from the fluid. The filter insert may be called filter cartridge or filter module.

The filter arrangement comprises a filter housing, which may be non-removably attached to the internal combustion engine. The filter housing may be cup-shaped with an upper open, access end for receipt of the filter insert. The filter housing further encompasses at least one inlet for raw fluid to be filtered, which empties into a raw side of the filter housing, and an outlet, which starts at a clean side of the filter housing, for filtered clean fluid. The inlet and outlet are provided in a lower portion of the filter housing. The filter housing defines a longitudinal axis, along which the filter insert can be inserted into the filter housing and removed from it. The filter arrangement further comprises a removable lid for closing the open end of the filter housing during operation. The lid may also be called cover or cap.

The invention can be applied in an internal combustion engine, such as a diesel engine, for heavy-duty vehicles, such as trucks, buses and construction equipment. Although the invention will be described with respect to a diesel engine for a truck, the invention is not restricted to this particular application, but may also be used in other types of engines and for other types of vehicles, such as passenger cars.

U.S. Pat. No. 6,572,768 discloses an oil filter apparatus comprises a housing formed to include an interior region and an aperture, a drainage valve positioned in the interior region for movement relative to the housing between an opened position allowing oil to drain out of the interior region through the aperture and a closed position blocking drainage of oil out of the interior region through the aperture, a filter module positioned in the interior region to filter oil, a valve actuator coupled to the filter module, and an anti-rotation device positioned to block rotation of the filter module relative to the housing to guide the valve actuator into communication with the drainage valve to move the drainage valve to the closed position when the filter module is installed in the interior region.

It is desirable to provide a filter insert, which creates conditions for a reliable positioning of a closing means/drainage member relative to its associated aperture in an efficient way, especially with regard to filter insert exchange.

According to an aspect of the invention, a filter insert is provided for being removably arranged in a filter housing, wherein the filter insert defines a first end and a second end opposite the first end, comprising a closing means at the first end of the filter insert for controlling opening and closing, respectively, of an aperture, wherein the filter insert comprises an actuation means operatively connected to the closing means for actuating the closing means, wherein the actuation means is positioned at the second end of the filter insert and wherein the actuation means is accessible for external contact at the second end of the filter insert.

The actuation means may be arranged to face outwards from the second end in an axial direction of the filter insert. The position of the actuation means creates conditions for being actuated by a filter housing lid and especially during fastening of the lid to the filter housing. Thus, closing of the aperture via the closing means may be performed automatically when the lid is fastened to the filter housing, which creates conditions for a secure operation acid time-efficient filter insert insertion in that there is no separate activity required by a service technician for closing the aperture. According to an alternative, the actuation means is designed so that closing of the aperture via the closing means is performed manually via actuation of the actuation means before the lid is attached to the housing.

According to one embodiment example, the actuation means is adapted for being actuated by a filter housing lid, which is adapted for closing a filter insert access end of the filter housing. Preferably, the filter housing lid has complimentary shaped contact means for contacting and operating the actuation means.

According to a further embodiment example, the actuation means is adapted for allowing a relative turning movement between the lid and the filter insert while it is actuated by the lid. The relative turning movement between the lid and the filter insert creates conditions for acting on the actuation means at least partly in an axial direction when the lid is attached to the filter housing via a turning movement. Thus, the relative turning movement between the lid and the filter insert causes movement of the closing means via the actuation means.

According to a further embodiment example, the actuation means is adapted for transferring a turning movement of the filter housing lid to a linear movement for actuating the closing means. The linear movement is preferably in parallel with an axial direction of the filter insert. The axial direction is defined as a main extension direction or center axis of the filter insert between the first end and the second end.

According to a further embodiment example, the actuation means comprises an external contact surface defining a projection or recess. The projection or recess preferably faces outwards in an axial direction of the filter insert. Thus, the second end of the filter insert has a varying height in the axial direction formed by the projection or recess.

According to a further development of the last-mentioned embodiment example, the projection or recess forms pan of a structure with varying extension in an axial direction of the filter insert along a circumferential direction of the filter insert. The varying extension may either be formed discontinuously (abruptly) such as via a separate push-rod or continuously such as via at least one ramp in the circumferential direction of the filter insert on an external surface of the filter insert.

According to a further embodiment example, the actuation means is eccentrically positioned at the second end of the filter insert. In this way, a lid with a complimentary shaped contact means (such as a ramp in its circumferential direction) may effect the control means of the filter insert via acting on the actuation means when the lid is fastened to the filter housing via a turning movement.

According to a further embodiment example, the closing means is eccentrically positioned at the first end of the filter insert. This embodiment example creates conditions for aligning the closing means with the actuation means for a linear movement between the closing means and the actuation means. Preferably, the eccentric position of the closing means at the first end of the filter insert and the eccentric position of the actuation means at the second end of the filter insert overlap in an axial direction of the filter insert. This embodiment example creates conditions for aligning the closing means with the actuation means for a linear movement in the axial direction of the filter insert between the closing means and the actuation means.

According to a further embodiment example, the filter insert comprises a transfer member extending between the first end and the second end of the filter insert and being movably arranged for transferring a movement between the actuation means and the closing means. Thus, the transfer means is operatively connected to the actuation means and to the closing means.

According to a further development of the last-mentioned embodiment example, the filter insert comprises filter material body and wherein the transfer member being movably arranged in relation to the filter material body. In other words, the transfer member may be a separate unit moveable relative to the filter material body.

Preferably, the transfer member is rigid. Further preferably, the transfer member is straight. Further preferably, the transfer member is formed by an elongated element. For example, the transfer member may be formed by a separate push rod arranged eccentric with regard to a center axis of the filter insert. This creates conditions for a space and cost efficient construction for transferring the movement between the actuation means and the closing means in that it may be accomplished solely by a relatively small element (in relation to the size of the filter insert).

According to a further embodiment example, the transfer member is arranged eccentrically with regard to a center axis of the filter insert. The eccentric transfer member may be formed as a push-rod positioned between adjacent pleats in the case the filter material body is formed by a pleated paper structure.

According to an alternative to the last-mentioned embodiment example, the transfer member is arranged concentrically with regard to a center axis of the filter insert. The concentric transfer member may be formed as a tubular push-rod positioned in a central opening of a hollow filter material body.

Preferably, the actuation means is formed in a one-piece unit with the transfer member. Further preferably, also the closing means is formed in a one-piece unit with the transfer member. Thus, a single unit, such as a push rod, may be used for closing the aperture, which creates conditions for a cost efficient design.

According to a further embodiment example, the filter insert comprises a filter material body and wherein the filter insert comprises a filter material body support structure at at least one of the first end and the second end, wherein the filter material body support structure has a main extension in a direction transverse to an axial direction of the filter insert.

The filter material body preferably has a cylindrical shape. The term "cylindrical shape" defines a volume enclosed by two planes perpendicular to an axis extending in an axial direction of the filter insert. The cross section of the cylinder at right angles to the axis is preferably circular forming a right circular cylinder. The filter material body may be hollow-cylindrical and formed by a pleated structure. However, the filter material body may be non-cylindrical, for example the volume may not be defined by two planes perpendicular to an axis. The axially limiting portions of the filter material body may be planes, but at least one of them may be non-perpendicular in relation to said axis. Further, at least one of the axially limiting portions of the filter material body may have a shape deviating from a straight plane, such as curved.

The filter insert and the lid may be designed with complimentary shaped means for engaging the lid to the filter insert in such a way that a used filter insert is withdrawn from the filter housing when the lid is detached from the filter housing. This may be achieved in that the lid has a centrally positioned engagement structure projecting in a center axis direction of the lid and the filter insert has a complimentary shaped engagement structure projecting in an axial direction of the filter insert. It creates conditions for a less messy filter insert exchange operation since the service operator may only contact the lid during withdrawal of the filter insert from the filter housing, especially if the lid engagement means is adapted for a connection between the lid and the filter insert guiding means allowing the filter insert and the lid to be interconnected for being moved in unison in relation to the filter housing. Further, preferably, the lid engagement structure is rigidly attached to one of the filter material body support structures at the axial end of the filter insert.

The filter material body support structure has a main extension in a radial direction of the filter insert. The filter material body support structure is preferably configured to give a rigid support to the filter insert. The filter material body support structure is preferably configured to be provided with sealing means for sealing the filter insert to the filter housing and the lid, respectively. Preferably, the filter material body support structure has a plate shaped structure. Preferably, the filter material body support structure is attached to one end of the filter material body. The filter material body support structure may be formed by a separate unit, such as a plastic disc attached to the filter material body. Alternatively, the filter material body support structure may be formed by attaching a glue or other substance to an end of the filter material body. The substance attached may dissolve an end portion of the filter material body, which is then solidified, so that the fiber material body support structure is partly made up of an end portion of the filter material body. This may for example be the case where the filter material body is formed by a pleated paper.

According to a further embodiment example, the closing means is moveably arranged in relation to a first of said filter material body support structures at the first end of the filter insert. This may be realized when the closing means forms part of a separate push-rod arranged to be moveable in the axial direction of the filter insert. Preferably, the closing means projects axially from the first filter material body support structure in at least an aperture closing position.

According to an alternative, the closing means is rigidly attached to the second filter material body support structure at the first end of the filter insert. Preferably, the closing means is formed in a one-piece unit with the first filter material body support structure at the first end of the filter insert, wherein the closing means projects axially from a main portion of the fast filter material body support structure.

According to a further embodiment example, the actuation means is moveably arranged in relation to a second of said filter material body support structures at the second end of the filter insert. This may be realized when the actuation means forms part of a separate push-rod arranged to be moveable in the axial direction of the filter insert. Preferably, the actuation means projects axially from the second filter material body support structure in at least a first position associated to an open position of the closing means.

According to an alternative, the actuation means is rigidly attached to the second filter material body support structure at the second end of the filter insert. Preferably, the actuation means is formed in a one-piece unit with the second filter material body support structure at the second end of the filter insert. According to one example, the actuation means projects from a main portion of the second filter material body support structure at the second end of the filter insert. According to one example, the complete filter insert forms a kind of push rod, wherein the linear force is transmitted from the actuation means at the second end of the filter insert to the closing means at the first end of the filter insert via the filter material body and/or a central tubular structure connecting the filter material body support structures at the first end and the second end of the filter insert.

According to a further embodiment example, the closing means comprises a body and a sealing element positioned around the body for sealingly contacting a wall defining the aperture for closing the aperture. The sealing element may be formed by an elastic ring, such as a rubber ring.

Preferably, the closing means forms a drainage valve actuating means. The drainage valve actuating means may be formed by a blocking element for being received in a seat defining an entrance to a drainage aperture in the filter housing.

According to an alternative to a drainage valve, the closing means may be designed to act on a valve situated in the oil filter housing outlet and/or inlet, to not transfer dirty oil to the outlet and/or inlet whilst oil filter housing is opened during service occasion.

According to a further embodiment example, the filter insert is adapted for filtering a fluid, such as oil, fuel or air, for an internal combustion engine.

According to a further embodiment example, the filter arrangement further comprising, a filter housing lid, which is adapted for closing a filter insert access end of the filter housing, wherein the lid comprises means for contacting the actuation means at the second end of the filter insert so that the closing means is actuated during engagement of the lid with the filter housing. The closing means may be operated during fastening of the lid to the filter housing. Thus, closing of the aperture via the closing means may be performed automatically when the lid is fastened to the filter housing, which creates conditions for a secure operation and time-efficient filter insert insertion in that there is no separate activity required by a service technician for closing the aperture.

Preferably, at least one of the contact means of the lid and the actuation means of the filter insert has a varying extension in a center axis direction of the lid and/or an axial direction of the filter insert along a circumferential direction for actuation of the control means during a turning movement of the lid relative to the filter housing for engagement of the lid with the filter housing. The center axis of the lid preferably coincides with a rotational axis of the lid.

According to a further embodiment example, the lid comprises a plate shaped member and wherein the contact means comprises at least one projection extending from the plate shaped member in the direction of a center axis of the lid and wherein the projection forms a ramp in the circumferential direction of the lid.

According to a further development of the last-mentioned embodiment example, an external peripheral edge of the plate shaped member forms part of a key-lock structure for fitting with a complimentary shaped part of the filter housing during a movement of the filter lid towards the filter housing. Preferably, the key-lock structure is adapted for allowing and/or guiding a linear movement of the filter lid towards the filter housing. Further preferably, the key-lock structure is adapted for allowing a movement of the filter lid towards the filter housing along the longitudinal axis of the filter housing so that the center axis of the lid coincides with the longitudinal axis of the filter housing. The plate shaped member of the lid is discontinuous at its peripheral edge in a circumferential direction of the lid for allowing a relative axial movement of the plate shaped member past a radially inwards projecting element of the filter housing.

According to a further development of the last-mentioned embodiment example, the plate shaped member comprises a seat at a first side of the plate shaped member for receipt of a radially inwards projecting element of the corresponding key-lock structure of the filter housing. The fastening means of the lid and the filter housing are designed for allowing a first relative axial movement between the lid and the housing, wherein the radially projecting element is received in the passage followed by a relative circumferential movement between the lid and the housing, wherein the radially projecting element is moved towards the seat. Preferably, the fastening means of the lid and the filter housing are designed for a relative turning movement of less than a complete turn and especially less than half a complete turn and especially less than a quarter of a complete turn, which creates conditions for a quick attachment and removal of the lid from the housing. The fastening means of the lid and the filter housing are designed for a relative turning movement of about ⅛ turn.

According to a further development of the last-mentioned embodiment example, a portion of the plate shaped member between an axial passage in the key-lock structure for the projecting element and the seat is arranged to be wedged between the projecting element and an axially opposite surface of the filter housing during a relative circumferential movement of the plate shaped member and the filter housing thereby creating a resistance to the relative circumferential movement during turning of the lid. This design creates conditions for a good feedback to the service technician of the status of the fastening of the lid to the filter housing, especially in the case the lid and filter housing are designed for fastening of the lid solely via hand force.

According to a further embodiment example, the lid comprises a handle at an opposite side of the lid relative to the contact means. The handle may be used to provide a turning torque to fasten the lid to the filter housing.

According to a further embodiment example, the contact means of the lid is separate from fastening means of the lid for fastening to the filter housing. For example, the fastening means may be formed at an outer peripheral edge of the plate-shaped member of the lid while the contact means is formed on a lower side of the plate-shaped member of the lid.

According to a further embodiment example, the filter arrangement further comprising a filter housing with an access opening for receipt of the filter insert and wherein the filter housing lid is arranged for opening and closing, respectively, the filter insert access opening. Preferably, the filter housing comprises means forming part of a key-lock structure for fitting with a complimentary shaped plate shaped member of the lid during a movement of the lid relative to the filter housing. Preferably, the key-lock structure is adapted for allowing a linear movement of the filter lid towards the filter housing.

According to a further embodiment example, the filter housing comprises a circumferential groove for receipt of a part of the plate shaped member of the lid during a turning movement of the lid relative to the filter housing. The circumferential groove is arranged axially spaced from the key-lock structure of the filter housing for allowing a turning movement of the lid relative to the filter housing after the linear movement of the lid relative to the filter housing.

According to a further embodiment, a filter arrangement is provided comprising a filter housing with an access opening for receipt of a removable filter insert and a filter housing lid, which is adapted for opening and closing, respectively, the filter insert access opening of the filter housing, wherein the filter housing and the lid comprise means complimentary shaped for fastening via a first linear movement of the lid and a consecutive turning movement of the lid.

Thus, this design of filter arrangement differs from conventional designs, where the lid is fastened to the filter housing via a threaded structure, wherein the lid is fastened to the filter housing solely via a rotational movement a plurality of complete turns.

Preferably, the fastening means of the lid and the filter housing are designed for a relative turning movement of less than a complete turn and especially less than half a complete turn and especially less than a quarter of a complete turn, which creates conditions for a quick attachment and removal of the lid from the housing.

According to one embodiment example, the lid comprises a plate shaped member and wherein an external peripheral edge of the plate shaped member forms part of a key-lock structure for fitting with a complimentary shaped part of the filter housing during the linear movement of the filter lid. This design creates conditions for achieving a locking functionality when the lid is turned relative to the filter housing during the consecutive turning movement.

According to a further embodiment example, the plate shaped member is discontinuous at its peripheral edge in a circumferential direction of the lid for allowing movement of the plate shaped member past a radially inwards projecting element of the filter housing during the linear movement of the filter lid. This specific design creates conditions for achieving a locking functionality when the lid is turned relative to the filter housing during the consecutive turning movement in a space efficient way.

According to a further embodiment example, the plate shaped member comprises a first portion for being positioned behind the projecting element in a connected, operational position of the lid, after the turning movement for blocking a withdrawal of the plate shaped member along a center axis of the lid. Thus, a locking functionality is achieved.

According to a further embodiment example, the plate shaped member comprises a stop means for stopping further relative turning movement of the plate shaped member when the first portion has reached its intended position behind the projecting element. This design creates conditions for feedback to the service technician that the lid has reached its operative position when the projecting element hits the stop means.

According to a further embodiment example, the first portion comprises at least one seat for the projecting element on a first side of the first portion and at the peripheral edge of the plate shaped member. The seat may be slightly recessed thereby blocking any undesired turning movement of the lid relative to the filter housing in an opposite direction relative to the fastening direction.

According to a further embodiment example, the seat is defined by a bottom surface facing in a center axis direction of the lid and a side wall forming a boundary for the bottom surface and extending substantially in parallel with the center axis direction of the lid. This design creates conditions for a secure receipt of the projecting element.

According to a further embodiment example, the seat has the shape of an arc in a cross section at right angles to the center axis direction of the lid. Preferably, the arc extends radially inwards from a peripheral edge of the plate shaped member. Preferably, the seat has the shape of a semi-circle.

According to a further embodiment example, the plate shaped member comprises at least one passage at the peripheral edge of the rigid plate shaped member for the projecting element for allowing the relative linear movement of the plate shaped member past the projecting element.

According to a further embodiment example, the passage is circumferentially spaced from the seat. Preferably, the passage is circumferentially spaced from the seat so that a centre plane of the passage through a centre axis of the filter forms an angle of at least 20 degrees, preferably at least 30 degrees, especially at least 40 degrees in relation to a centre plane of the seat through the centre axis of the filter. Further preferably, the passage is configured for guiding the plate shaped member relative to the projecting element during the relative axial movement of the plate shaped member past the projecting element.

According to a further embodiment example, the passage has the shape of an arc in a cross section at right angles to the center axis direction of the lid. Preferably, the passage has the external shape of a semi-circle. The shape and size of the seat and the passage is preferably the same. According to a further embodiment example, the seat and the passage has substantially the same shape in a cross section at right angles to an axial direction of the filter.

Further preferably, the projection is complimentary shaped to the passage and seat. In the specific example, the projection has the shape of an arc. Further, the projection is preferably plate-shaped. Further preferably, the projection has the shape of a semi-circle.

According to a further embodiment example, the plate shaped member comprises a plurality of circumferentially spaced pairs of seat and passage. This design creates conditions for a robust construction due to the fact that the engagement contacts between the lid and the filter housing are provided at a plurality of circumferentially spaced positions.

According to a further embodiment example, a portion of the plate shaped member between the seat and the passage is configured to be wedged between the projecting element and a filter housing surface during the turning movement of the lid and thereby creating a resistance to the turning movement. This design creates conditions for feedback to the service technician in that the resistance against the turning movement will decrease when the radially projecting element passes the wedging area towards the operative position.

Preferably, the projecting member guiding surface forms a crest positioned at a larger axial distance from a second side of the first portion than a bottom surface of the seat is positioned from the second side of the first portion. Further preferably, the crest is positioned closer to the seat than the passage. Further preferably, the crest is defined by a side wall of the seat. This design creates further conditions for feedback to the service technician in that the resistance against the turning movement will decrease when the radially projecting element passes the crest towards the operative position.

Further preferably, a portion of the projecting member guiding surface between the passage and the crest has an inclination angle of less than 10 degrees. The guiding surface may form a ramp in a circumferential direction.

Further preferably, a bottom surface of the seat is recessed and wherein the stop means is formed by a first side wall portion of the seat at an opposite side of the seat relative to the passage.

According to a further embodiment example, the filter housing comprises a circumferential groove for receipt of a part of the plate shaped member of the lid during the turning movement of the lid relative to the filter housing.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
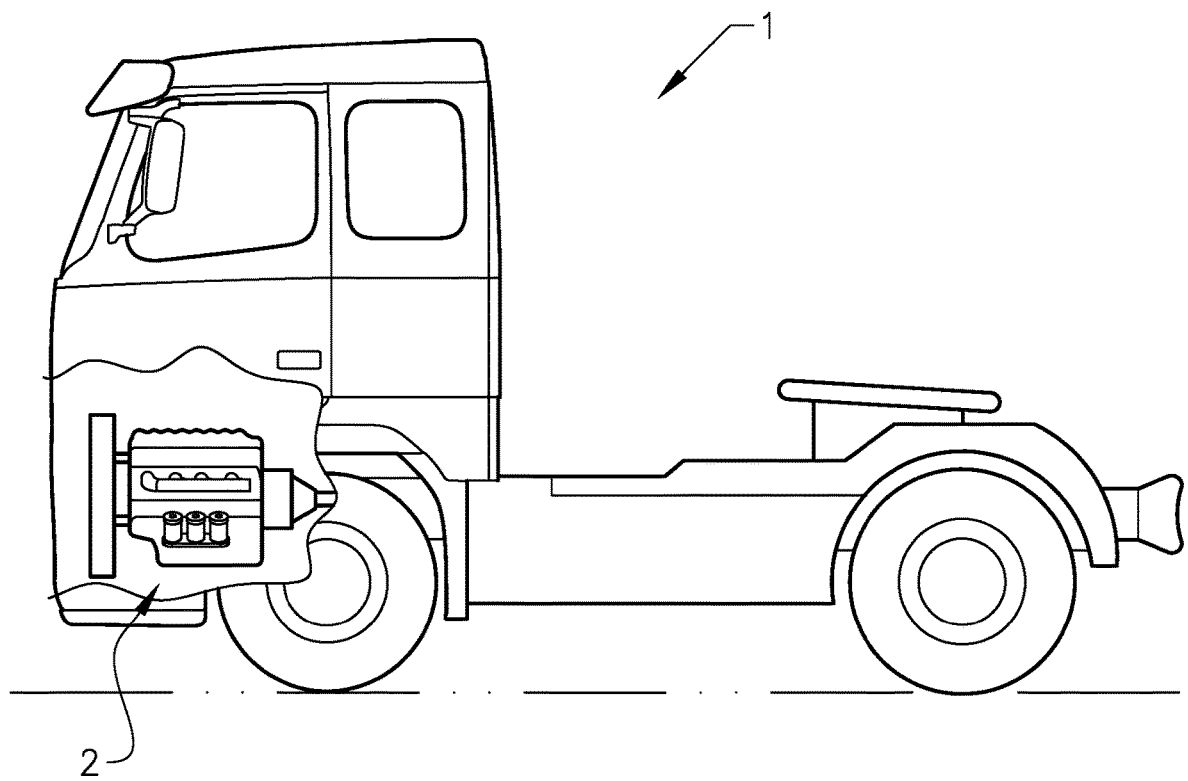
FIG. 1 discloses a vehicle in the form of a truck in a side view.

FIG. 1 discloses a vehicle in the form of a truck 1 in a partly cut side view. Further, an internal combustion engine in the form of a diesel engine 2 is indicated.

Figure 2:
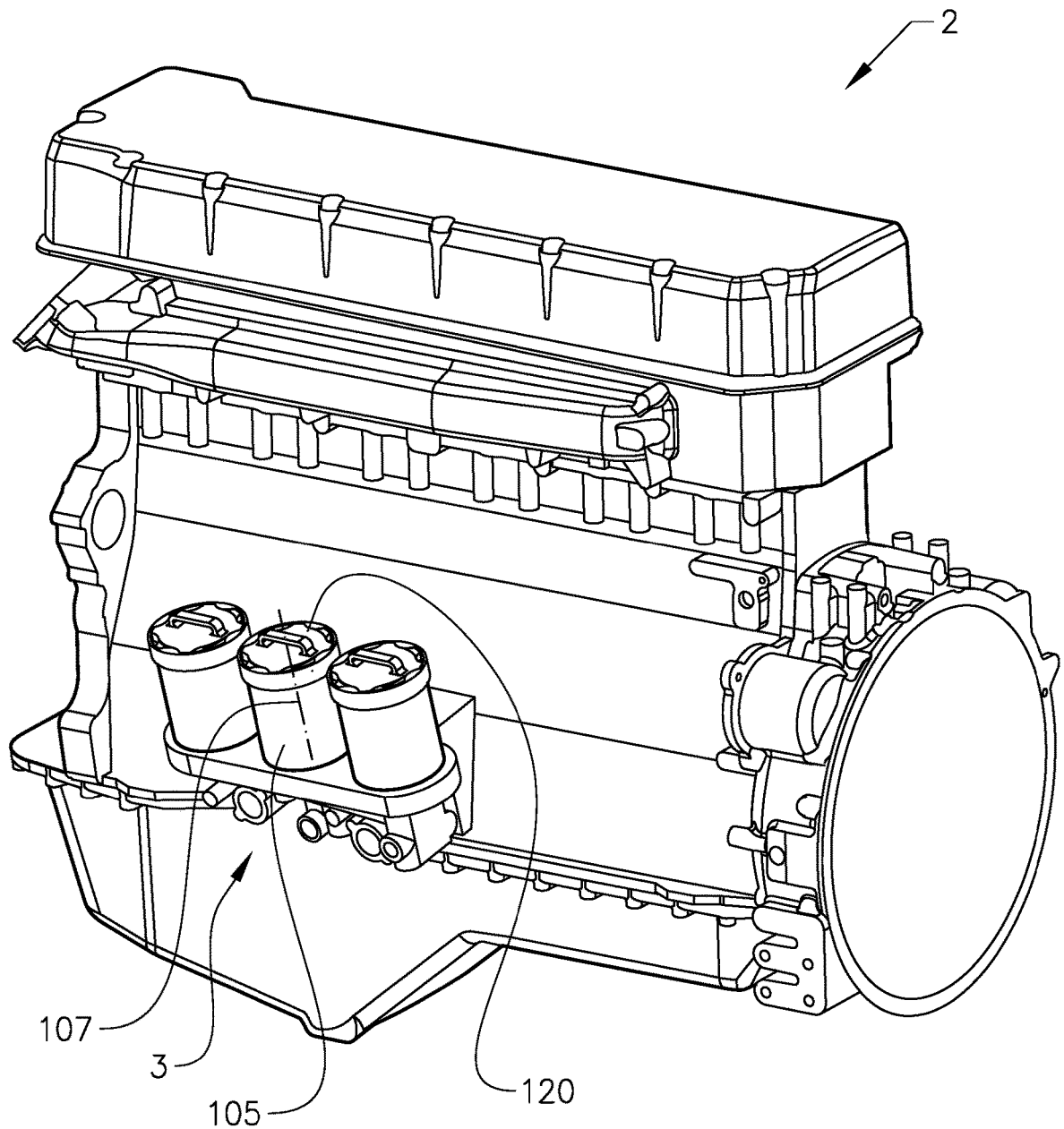
FIG. 2 discloses an internal combustion engine of the truck in a perspective view with a filter arrangement attached, FIG. 3 discloses the filter arrangement of FIG. 2 in a partly assembled state.

FIG. 2 shows the internal combustion engine 2 provided with a filter arrangement 3 according to a first embodiment of the invention. The filter arrangement 3 is adapted for filtering a fluid for the internal combustion engine. More specifically, there are three filter arrangements 3 arranged in parallel with each other. The filter arrangement 3 comprises a filter housing 105, which is non-removably attached to the internal combustion engine. The filter arrangement 3 is in an upright, standing position, slightly inclined outwards from its attachment at the bottom relative to a side of the ICE. A lower section of the filter arrangement comprises inlets and outlets. The filter housing 105 is in the form of a cup-shaped part, which is rigidly attached to the ICE at the lower section. The filter housing 105 defines a longitudinal axis 107 along which a filter insert (not shown) can be inserted into the filter housing and removed from the filter housing. The filter arrangement 3 further comprises a lid 120 for closing the filter housing.

Figure 3:
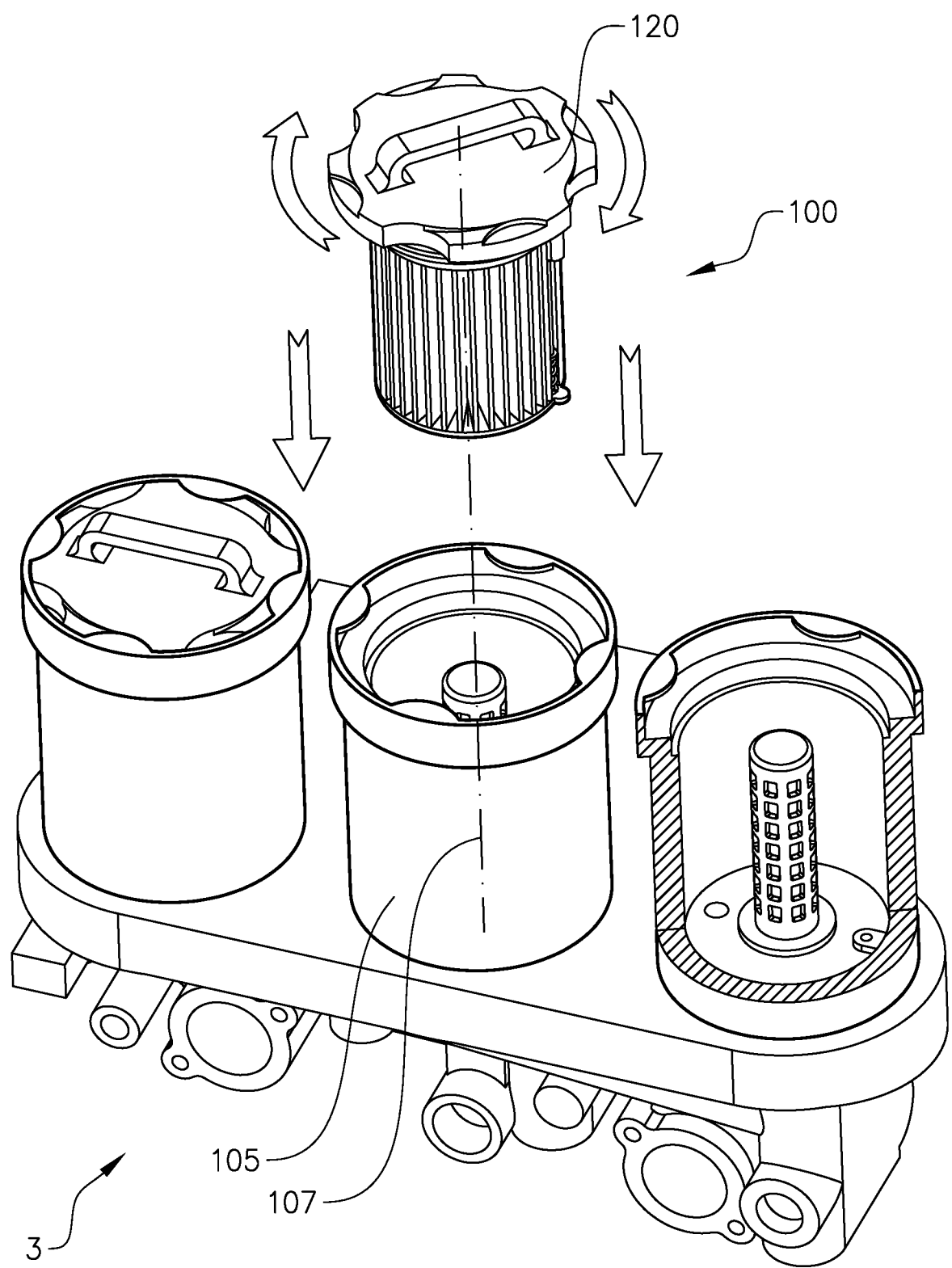

FIG. 3 discloses the filter arrangement 3 of FIG. 2 in a partly assembled state. A filter insert 100 according to a first embodiment example is attached to the lid 120 for being inserted into the filter housing 105 via a first linear movement in parallel with the longitudinal axis 107 followed by a turning movement around the longitudinal axis 107.

Figure 4:
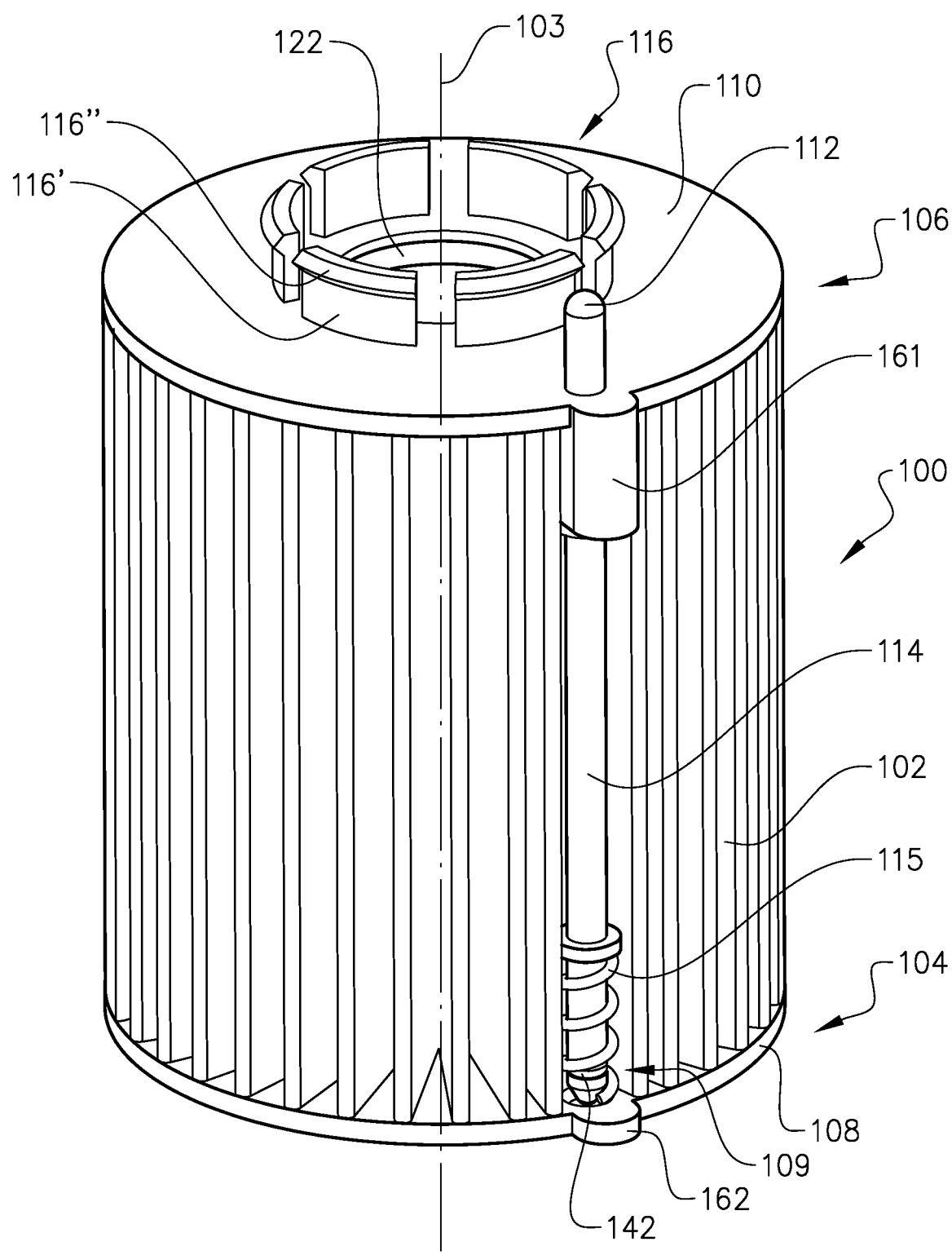
FIG. 4 is a perspective view from the top of a filter insert according to a first embodiment example.
Figure 5:
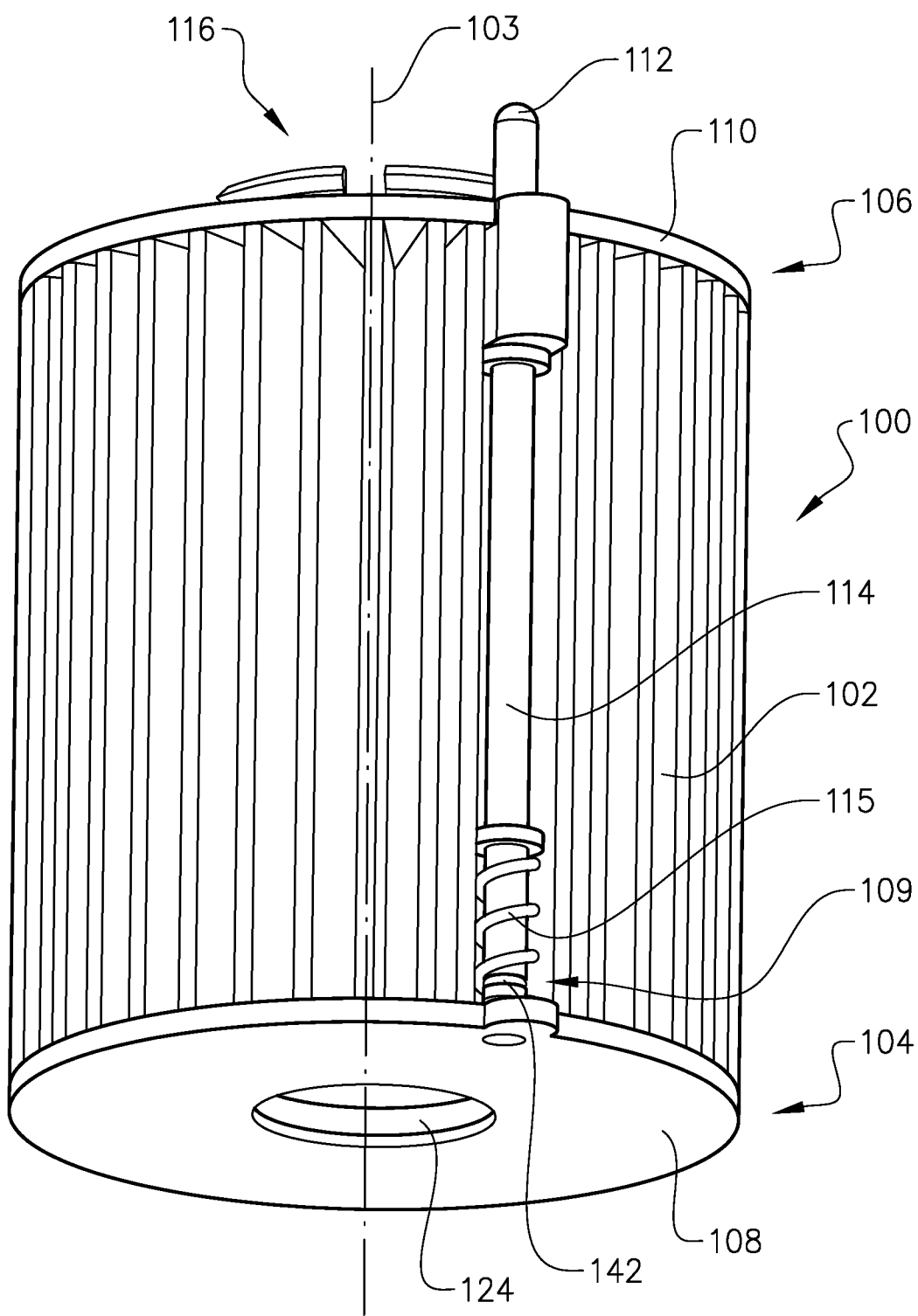
FIG. 5 is a perspective view from below of the filter insert according to the first embodiment example.

FIG. 4-5 shows the filter insert 100 from FIG. 3 for being removably arranged in the filter housing 105. The filter insert 100 defines a first end 104 and a second end 106 opposite the first end. The fitter insert 100 comprises a closing means 109 at the first end 104 of the filter insert for controlling opening and closing, respectively, of an aperture 140 in the filter housing, see further below. More specifically, the closing means 109 forms a blocking element for opening and closing, respectively, the aperture 140. The closing means 140 is formed by a body having a cross sectional shape and size similar to the aperture for a tight fit in the aperture. The closing means 109 has a cylindrical peripheral shape with a circular cross section. A sealing element 142 is positioned around the closing means body for sealingly contacting the walls defining the aperture 140 for closing the aperture.

Figure 10:
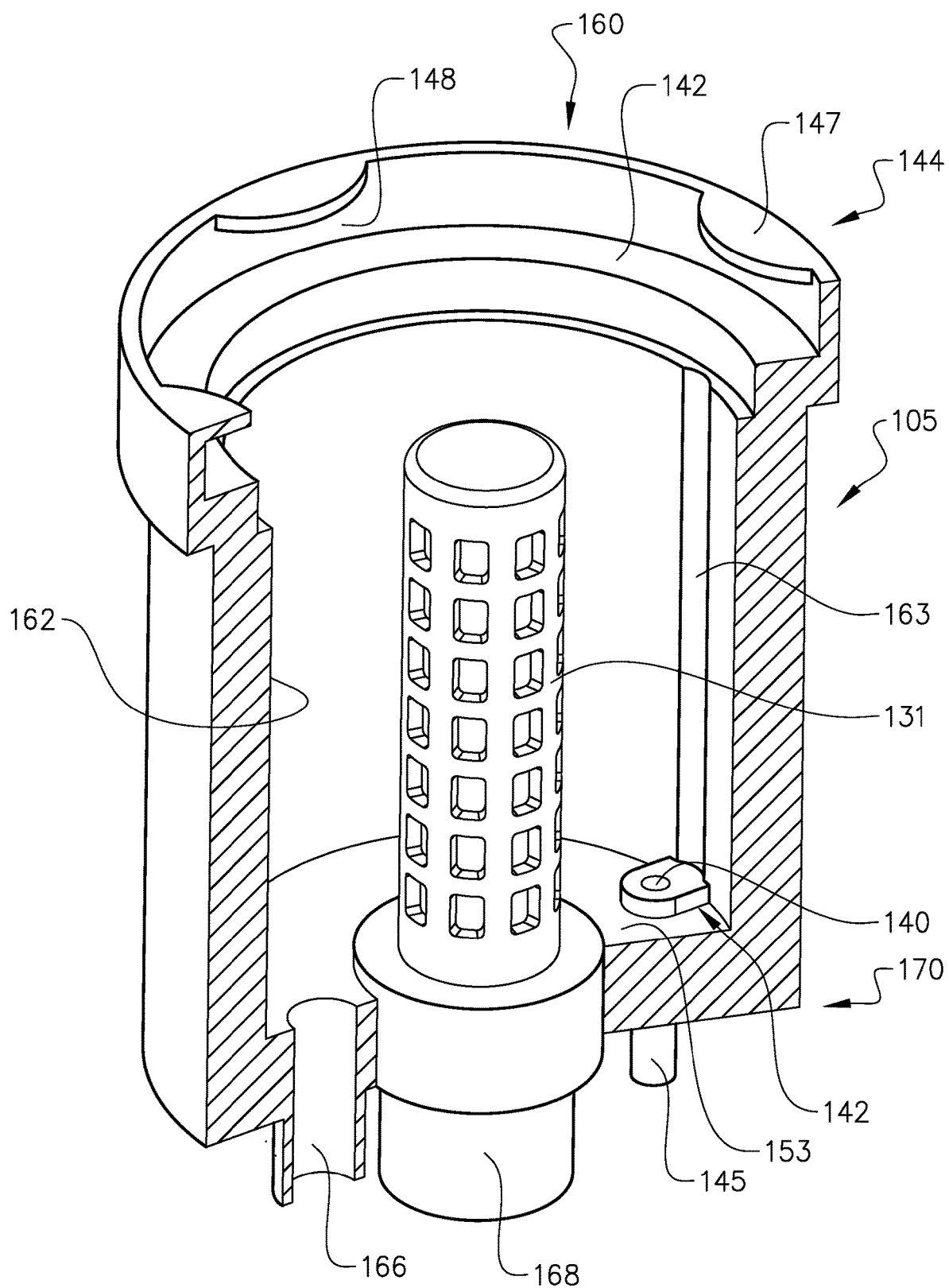
FIG. 10 is a partially cut perspective view from the top of a filter housing according to a first embodiment example.
Figure 11:
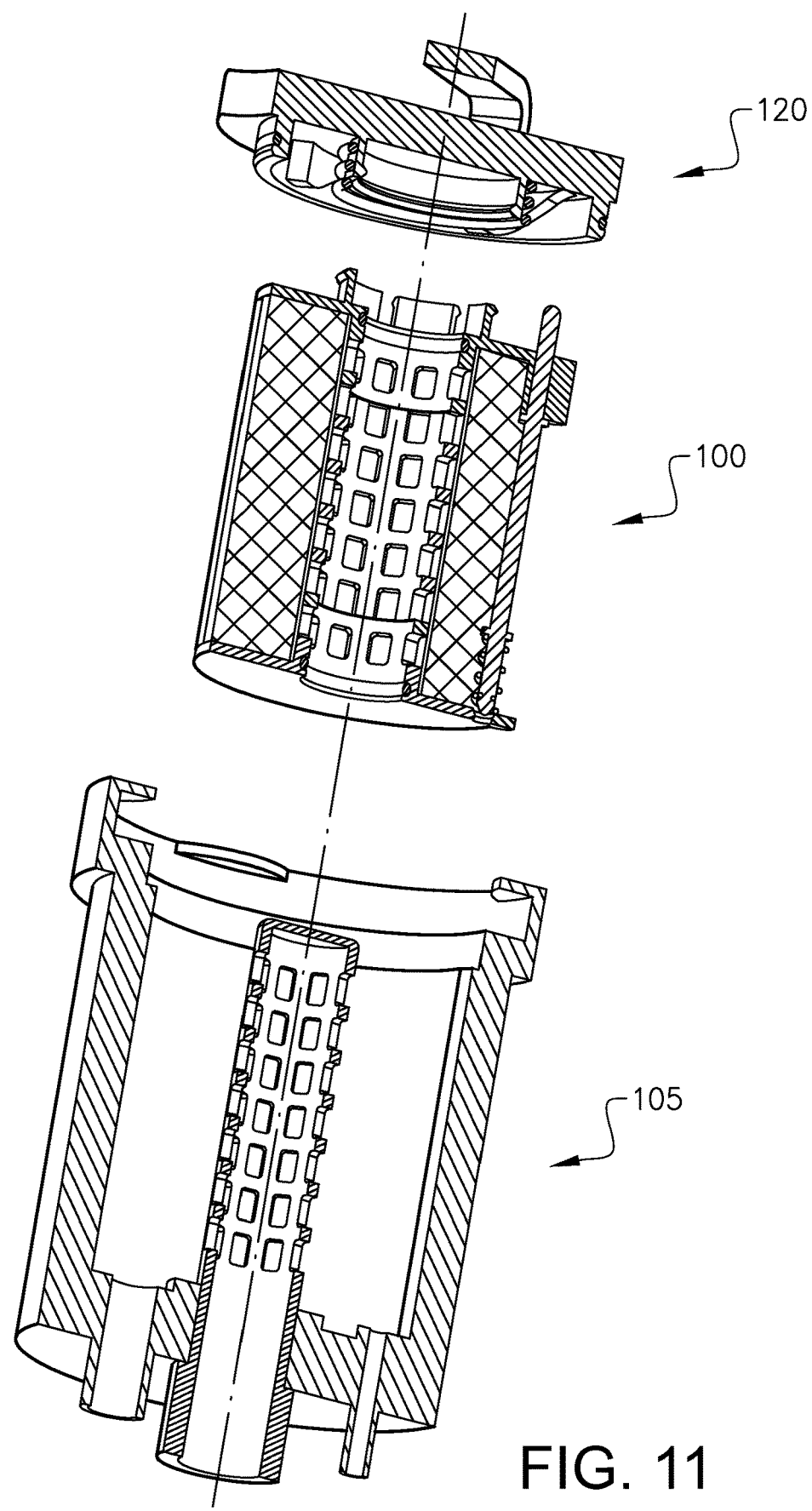
FIG. 11 is an exploded view of a filter arrangement according to a first embodiment example comprising the filter insert, lid and filter housing according to FIGS. 1-10.

The aperture 140 leads to a drain line 145, see FIG. 10, for draining out the oil from the oil filter housing 105 to gain a less oily situation for the service technician when a used filter insert is removed. The closing means 109 is eccentrically positioned. Further, the closing means 109 is adapted to be moved for closing the drainage aperture 140 when a new filter insert 100 is in its operational position in the filter housing 105. Further, the closing means 109 is adapted to be moved for opening the drainage aperture 140 during removal of a used filter insert 100 from its operational position in the filter housing 105.

The filter insert 100 further comprises an actuation means 112 operatively connected to the closing means 109 for actuating the closing means. The actuation means 112 is positioned at the second end 106 of the filter insert. Further, the actuation means 112 is accessible for external contact at the second end 106 of the filter insert 100. More specifically, the actuation means 112 is adapted for being actuated by the filter housing lid 120. Thus, the filter housing lid 120 has complimentary shaped contact means, which will be described further below, for contacting and operating the actuation means 112. Further, the actuation means 112 is adapted for allowing a relative turning movement between the lid 120 and the filter insert 100 while it is actuated by the lid. Thus, the relative turning movement between the lid and the filter insert causes movement of the closing means 109 via the actuation means 112.

Further, the actuation means 112 is adapted for transferring a turning movement of the filter housing lid 120 to a linear movement for actuating the closing means 109. The linear movement is preferably in parallel with an axial direction 103 of the filter insert. The axial direction is defined as a main extension direction or center axis of the filter insert between the first end and the second end.

The actuation means 112 comprises an external contact surface defining a projection facing in the axial direction 103 of the filter insert 100 in a state where the closing means is in a non-closing position. The actuation means 112 is substantially flush with, or projects somewhat from, the adjacent surface of the second end of the filter insert in a state where the closing means is in a closing position, see FIG. 12. The actuation means 112 is eccentrically positioned at the second end 106 of the filter insert 100. In this way, a lid 120 with a complimentary shaped actuation means (such as a ramp in its circumferential direction) may effect the control means of the filter insert via a turning movement of the lid.

The closing means 109 is eccentrically positioned at the first end 104 of the filter insert. The eccentric position of the closing means 109 at the first end 104 of the filter insert and the eccentric position of the actuation means 112 at the second end 106 of the filter insert overlap in the axial direction 103 of the filter insert.

The filter insert 100 comprises a transfer member 114 extending between the first end 104 and the second end 106 of the filter insert, which is movably arranged for transferring a movement between the actuation means 112 and the closing means 109. The transfer member 114 is rigid, straight and formed by an elongated element. More specifically, the transfer member 114 is formed by a separate push rod. The actuation means 112 is formed in a one-piece unit with the elongated element 114. More specifically, the actuation means 112 forms one end of the elongated element 114. Further, the closing means 109 is formed in a one-piece unit with the elongated element 114. Thus, the closing means 109 forms an opposite end of the elongated element 114.

The filter insert 100 comprises a spring member 115 associated to the transfer member 114 for urging the transfer member to a position where the closing means is in a non-closing position, ie upwards in FIG. 4-5.

The filter insert 100 comprises a filter material body 102. The filter material body 102 has a cylindrical shape. The cross section of the cylinder at right angles to the axis is circular forming a right circular cylinder. More specifically, the filter material body 102 is hollow-cylindrical defining a central opening. Further, the filter material body 102 is formed by a pleated structure extending between the central opening and a radially outer circumference of the filter insert. The transfer member 114 is movably arranged in relation to the filter material body 102. In other words, the transfer member 114 is a separate unit moveable relative to the filter material body 102. More specifically, the transfer member 114 is positioned between two adjacent pleats.

The filter insert 100 comprises a filter material body support structure 108,110 at both the first end 104 and second end 106, wherein the filter material body support structure 108,110 has a main extension in a direction transverse to an axial direction of the filter insert. The filter material body support structure has a plate shaped structure extending in a plane perpendicular to the axial direction 103 of the filter insert. The closing means 109 is moveably arranged in relation to a first of said filter material body support structures 108 at the first end 104 of the filter insert. The closing means 109 projects from the first filter material body support structure 108 when the closing means 109 is in a lower position closing the drainage aperture 140. The closing means 109 is substantially flush with, or somewhat retracted relative to the first filter material body support structure 108 when the closing means 109 is in an upper, retracted non-actuated position, ie non-closing the drainage aperture 140. The actuation means 112 projects upwards from the second filter material body support structure 110 when the closing means 109 is in a position non-closing the drainage aperture 140. Further, the actuation means 112 is substantially flush with, or projecting somewhat relative to the second filter material body support structure 110 when the closing means 109 is in a non-actuated position, ie non-closing the drainage aperture 140. More specifically, the filter material body support structure 108,110 has a main extension in a radial direction of the filter insert 100. The filter material body support structure 108,110 is preferably configured to give a rigid support to the filter insert.

The filter material body support structures 108,110 will in the following be referred to as an upper and lower panel 108,110. Thus, the filter material body 102 is delimited on the top by the upper panel 110 and on the bottom by the lower panel 108. The panels 108,110 may be formed by separate parts attached to the filter material body 102. The filter material body 102 is then bonded to the upper panel 108 and lower panel 110 at the edges of the filter paper in the axial direction of the filter insert. Alternatively, the panels 108,110 are formed by a glue or other fastening fluid attached to the edges of the filter material body 102 in the axial direction of the filter insert and then solidifed.

The filter insert 100 further comprises means 116 for engagement with the lid 120. It creates conditions for a less messy filter insert exchange operation since the service operator may only contact the lid during withdrawal of the filter insert from the filter housing, especially if the lid engagement means is adapted for a connection between the lid and the filter insert guiding means allowing the filter insert and the lid to be interconnected for being moved in unison in relation to the filter housing. The lid engagement means 116 is formed by a snap connection means 116 projecting axially from the upper panel 110. Thus, the lid engagement means 116 is rigidly attached to the upper panel 110. The snap connection means 116 comprises a plurality of circumferentially spaced fingers adapted for a radial flex. More specifically, each finger has a first portion 116' attached to the upper panel 110 and extending in parallel with the axial direction 103. Further, each finger has a second portion 116″ with a radial extension outwards from a free end of the first portion 116′. During connection to the lid, the circumferentially spaced fingers are configured to bend slightly radially inwards for passing an annular section of the lid and then flex back behind the annular section for locking the filter insert 100 to the lid 105.

Figure 6:
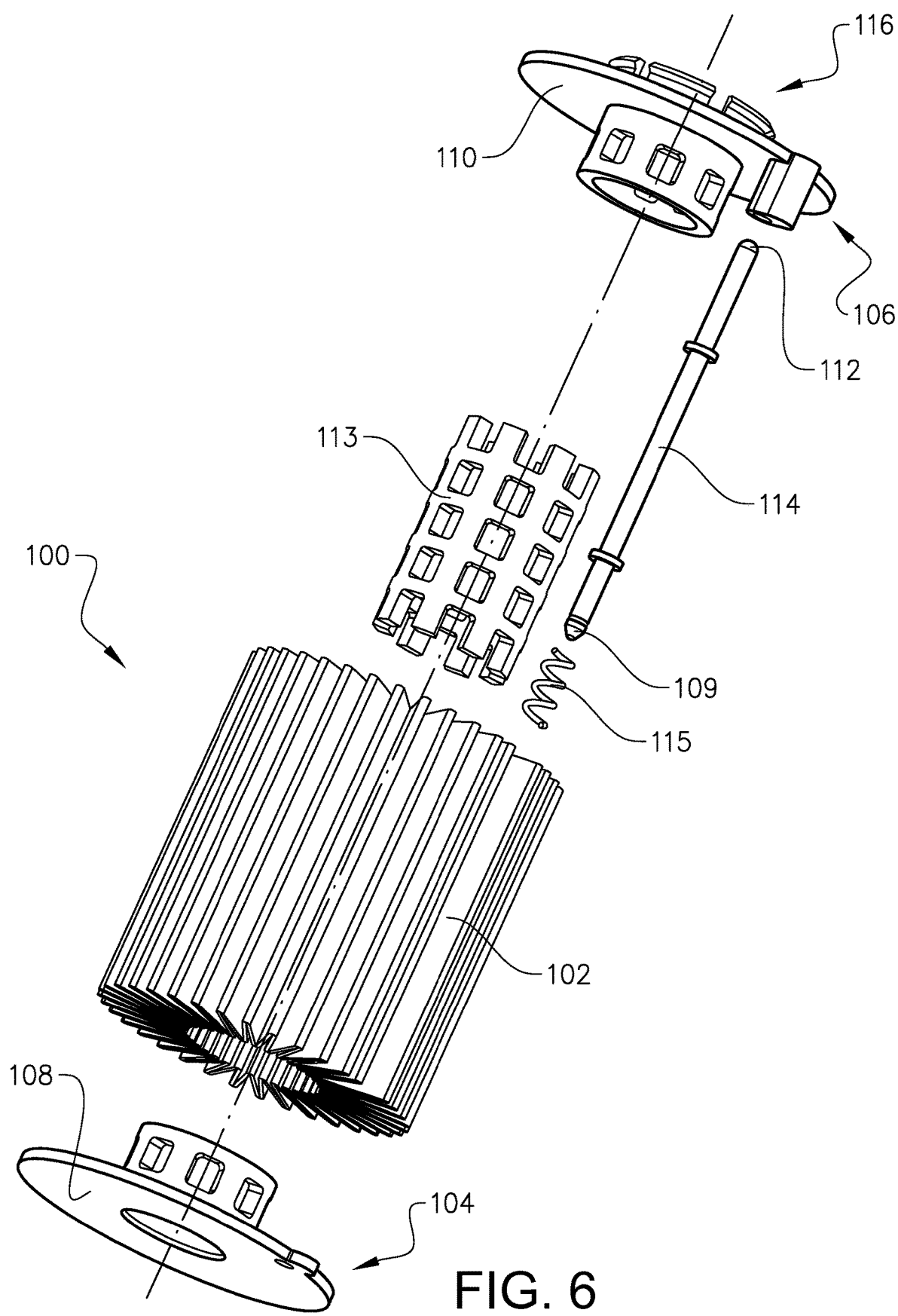
FIG. 6 is an exploded view of the filter insert of FIG. 4-5.

The filter insert 100 further comprises a central tubular structure 113, see FIG. 6. The central tubular structure 113 is positioned inside of the filter material body 102 and in contact with an inner periphery of the filter material body 102. The central tubular structure 113 supports the filter material body 102 and reduces risk of collapsing of the filter material body 102. According to one alternative, the filter insert does not comprise any such central tubular structure 113, which may be advantageous from a waste perspective (no disassembly of a used filter insert necessary).

The filter insert 100 further comprises sealing means 122,124 for sealingly engage an inner surface of the filter housing 105 and the lid 120, respectively, in order to separate a raw side from a clean side of the filtering arrangement. A first sealing means 122 in the form of a ring is provided on an external side of the upper panel 110 for a sealing engagement with the lid 120. A second sealing means 124 in the form of a ring is provided on an external side of the lower and 108 for a sealing engagement with a bottom surface of the filter housing 105.

The filter insert 100 comprises guiding means 161,162 for interaction with correspondingly shaped guiding means 163 of the filter housing 105, see FIG. 10, for positioning the filter insert 100 in the correct circumferential position in the housing 105 so that the closing means 109 is axially in line with the drainage opening 140 before the lid is turned. The guiding means 161,162 is formed by a radial projection from a circumference of the lower panel 108 and a radial projection from a circumference of the upper panel 110.

Figure 7:
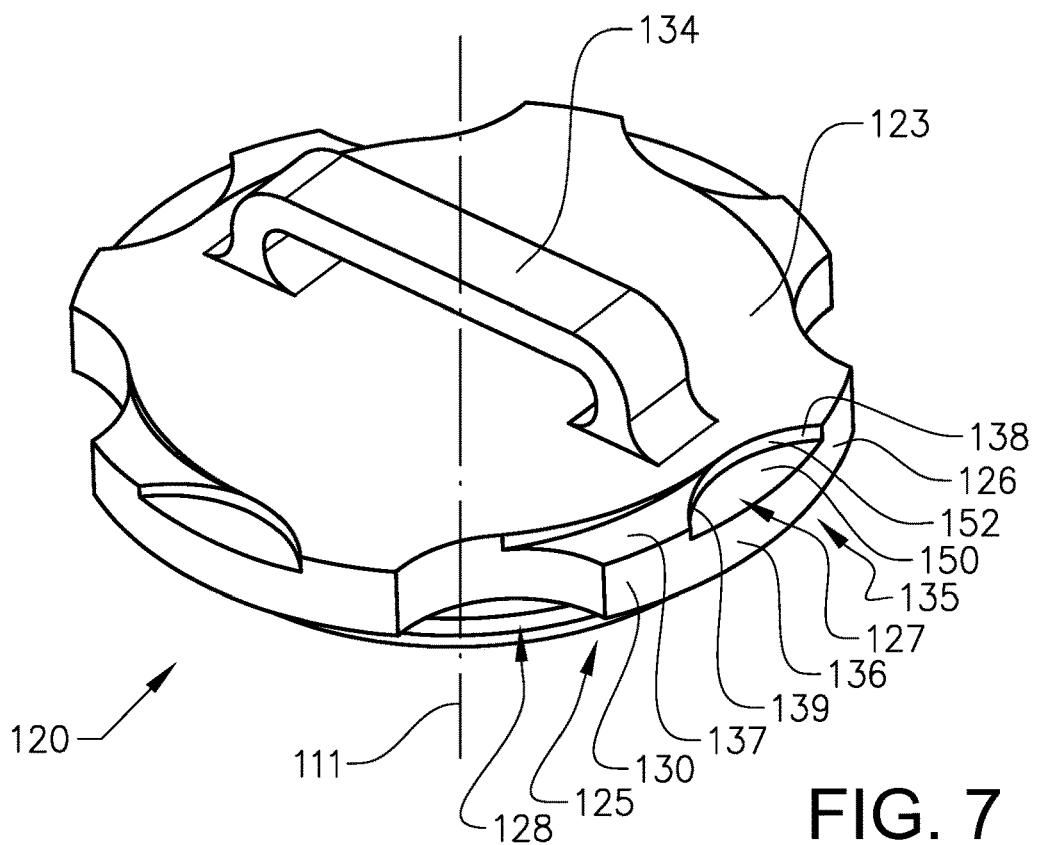
FIG. 7 is a perspective view from the top of a lid according to a first embodiment example.
Figure 8:
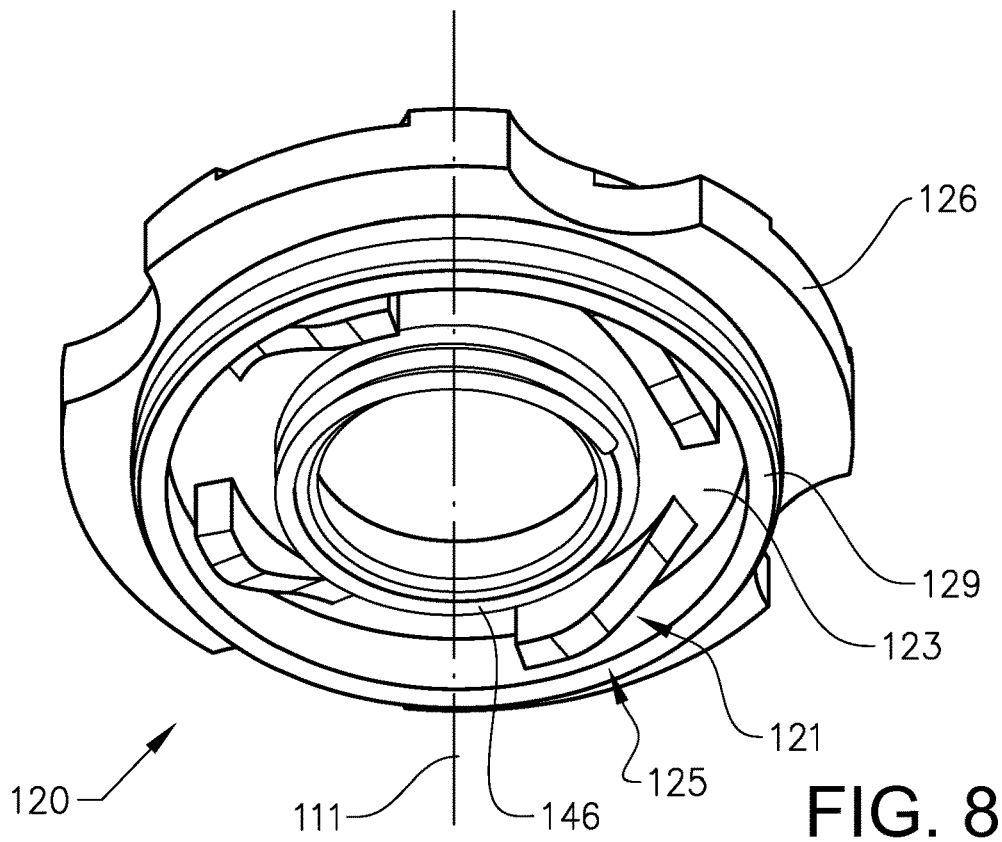
FIG. 8 is a perspective view from below of the lid according to the first embodiment example.
Figure 9:
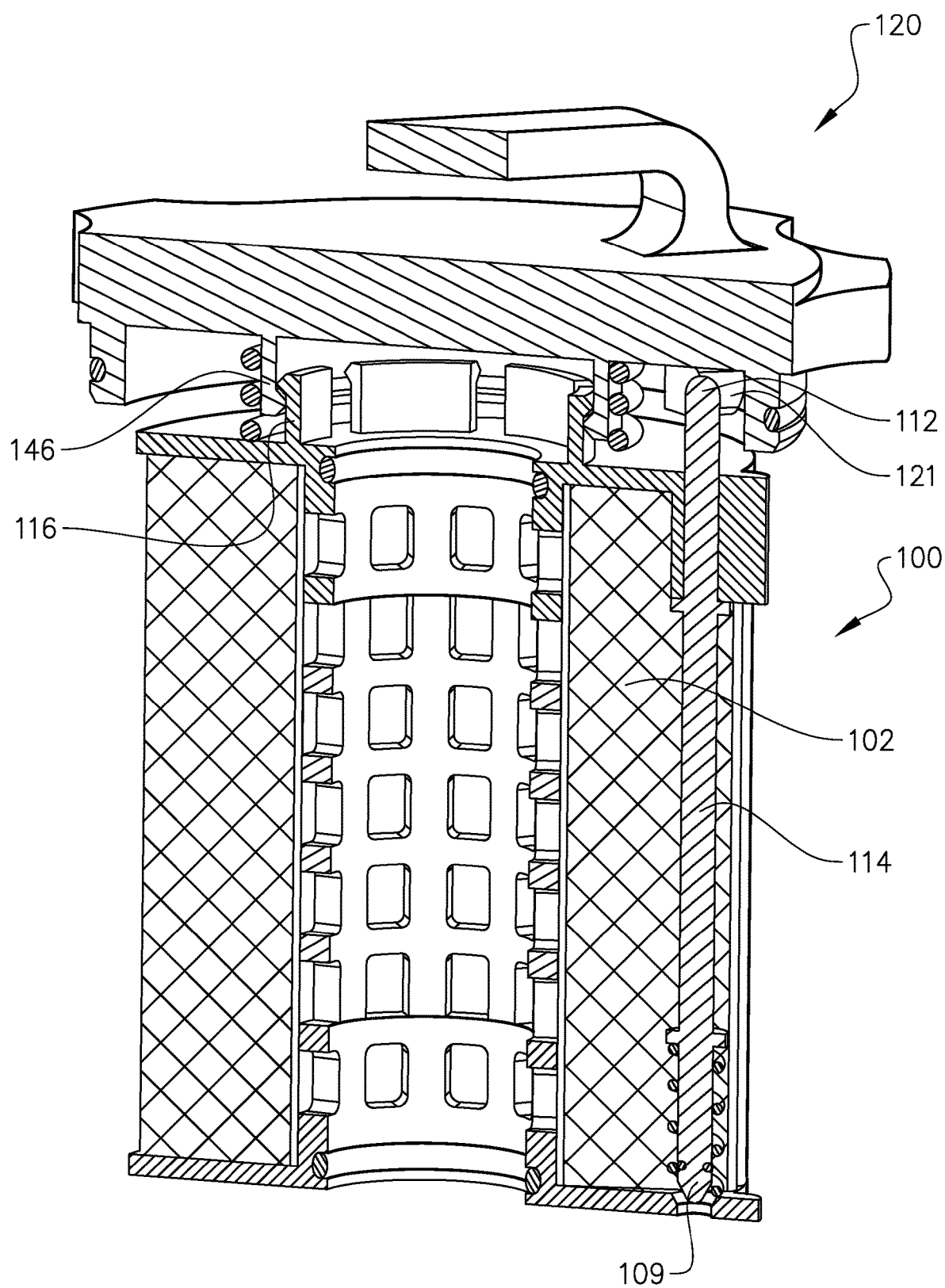
FIG. 9 is a partially cut perspective view from the top of the lid according to the first embodiment example attached to the filter insert according to the first embodiment example.

FIGS. 7 and 8 are perspective views from the top and bottom, respectively, of the lid 120 according to a first embodiment example. The lid 120 comprises means 121 for contacting the actuation means 112 at the second end 106 of the filter insert 100 so that the closing means 109 is actuated during engagement of the lid with the filter housing.

The contact means 121 of the lid 120 has a varying extension in a center axis 111 direction of the lid along a circumferential direction for actuation of the actuation means 112 during a turning movement of the lid relative to the filter housing for engagement of the lid with the filter housing. More specifically, the contact means 121 of the lid 120 is formed by an element projecting in the center axis direction and having a circumferential extension, wherein a contact surface has a continuously increasing extension in the center axis direction from a first end to a second end forming a plateau. In other words, the contact means 121 forms a ramp adapted for a gliding interaction with the actuation means 112, ie the upper end of the push rod, for pushing the push rod downwards during the turning movement of the lid. The center axis 111 of the lid preferably coincides with a rotational axis of the lid.

Further, the lid 120 comprises a plate shaped member 123 and the contact means 121 is arranged on a first side 125 of the plate shaped member 124. More specifically, the contact means 121 comprises at least one projection extending from the plate shaped member in the direction of a center axis 111 of the lid and wherein the projection forms said ramp in the circumferential direction of the lid. The contact means 121 is formed in one-piece with the plate shaped member 124.

An external peripheral edge 126 of the plate shaped member 123 forms part of a key-lock structure for fitting with a complimentary shaped part of the fitter housing 105 during a movement of the filter lid towards the filter housing. The key-lock structure is adapted for a linear movement of the filter lid 120 towards the filter housing 105. More specifically, the key-lock structure is adapted for allowing a movement of the filter lid 120 towards the filter housing 105 along the longitudinal axis 107 of the filter housing so that the center axis 111 of the lid coincides with the longitudinal axis 107 of the filter housing in a certain relative circumferential position. The plate shaped member 123 of the lid 120 is discontinuous at its peripheral edge 126 in a circumferential direction of the lid for allowing a relative axial movement of the plate shaped member 123 past a radially inwards projecting element 147 of the filter housing 105. More specifically, the plate shaped member 123 forms a passage 128 at its peripheral edge 126 for the radially inwards projecting element 147.

The plate shaped member 123 comprises a seat 127 at a second side of the plate shaped member for receipt of the radially inwards projecting element 147 of the corresponding key-lock structure of the filter housing. The seat 127 is defined by a bottom surface 150 facing in a center axis direction of the lid 120 and a side wall 152 forming a boundary for the bottom surface and extending substantially in parallel with the center axis direction of the lid. The seat has the shape of an arc in a cross section at right angles to the center axis direction of the lid.

The passage 128 is circumferentially spaced from the seat 127. The passage 128 is configured for guiding the plate shaped member 123 relative to the projecting element 147 during the relative axial movement of the plate shaped member passed the projecting element. The passage 128 has the shape of an arc in a cross section at right angles to the center axis direction of the lid. The passage 128 has a shape complimentary to the seat 127 and especially the same cross section with regard to shape and size. The plate shaped member 123 comprises a plurality of circumferentially spaced pairs of seat and passage.

The plate shaped member 123 comprises a first portion 136 for being positioned behind the projecting element 147 in a connected, operational position of the lid, after the turning movement for blocking a withdrawal of the plate shaped member along a center axis of the lid. Further, the plate shaped member 122 comprises a stop means 138 for stopping further relative turning movement of the plate shaped member when the first portion has reached its intended position behind the radially projecting element 147. A bottom surface of the seat is recessed and wherein the stop means is formed by a first side wall portion of the seat at an opposite side of the seat relative to the passage.

The plate shaped member 123 comprises a guiding surface 137 for the projecting member 147 on its second side between the passage 128 and the seat 127. The guiding surface 137 faces in the center axis direction of the lid. The projecting member guiding surface 137 forms a crest 139. Further preferably, the crest 139 is positioned closer to the seat than the passage. Further preferably, the crest is defined by a side wall of the seat. The projecting member guiding surface 137 between the passage 128 and the crest 139 has an inclination angle of less than 10 degrees and preferably more than 2 degrees and especially more than 5 degrees with regard to a plane perpendicular to the center axis of the lid.

A portion 130 of the plate shaped member 123 between the axial passage 128 and the seat 127 is arranged to be wedged between the projecting element 147 and an axially opposite, circumferentially continuous surface 142 of the filter housing, see FIG. 10, during the turning movement of the lid 120 thereby creating a resistance to turning movement.

The lid 120 comprises a handle 134 at the second side of the lid for manual operation of the lid by a service technician.

The contact means 121 of the lid 120 is separate from a fastening means 135 of the lid for engaging the filter housing. Said fastening means 135 of the lid is formed by the above described passage 128, intermediate portion 130 and seat 127.

The lid 120 comprises a means 146 for engaging the filter insert 100 so that the lid and the filter insert can be moved in unison relative to the filter housing, especially during withdrawal of a used filter insert from the filter housing. Said filter insert engaging means 146 is formed by a central tubular structure projecting from the first side 125 of the lid for engaging the snap means 116 of the filter insert. The tubular structure has a circumferentially extending groove in a radially inner wall for receipt of the second portion 116" of the snap means 116 of the filter insert 100 enabling a used filter insert 100 to be withdrawn from the filter housing 105 in unison with the lid 120.

The lid 120 further comprises an annular part 129 in the form of a collar projecting from the first, lower side of the plate shaped portion 123, which part 129 has a surface adapted for sealing engagement with a corresponding surface of the filter insert. The part 129 has the shape of a truncated cone, wherein the sealing surface is inclined in relation to a longitudinal axis of the lid. Further, the sealing pan 129 forms a one-piece unit with the plate shaped portion 122.

FIG. 10 shows the filter housing 105 according to a first embodiment example. The filter housing 105 has an access opening 160 for receipt of the filter insert 100 and wherein the filter housing lid 120 is arranged for opening and closing, respectively, the filter insert access opening 160. Preferably, the filter housing 105 comprises means 144 forming part of the key-lock structure for fitting with the complimentary shaped plate shaped member 123 of the lid during a movement of the lid relative to the filter housing. More specifically, the filter housing and the lid comprise means complimentary shaped for engagement via a first linear movement of the lid and a consecutive turning movement of the lid.

The filter housing 105 comprises a circumferential groove 148 at the access opening 160 for receipt of a radially outer part of the plate shaped member 123 and especially the portion 130 of the lid during the turning movement of the lid relative to the filter housing. The groove 148 is defined in the longitudinal direction 107 of the filter housing 105 on one side by a surface of the radially extending projection 147 and on the other side by the axial stop surface 142.

The radially extending projection 147 is plate-shaped and flat and extends in a plane perpendicular to the longitudinal direction 107 of the filter housing 105. Further, the radially extending projection 147 is arc-shaped, wherein the arc defines a radially outer surface of the plate-shaped portion 147. Further, the radially extending projection 147 has the external shape of a semi-circle. The shape and size of the radially extending projection 147 is matched to the seat and the passage and preferably the same or somewhat smaller in size for a tight fit. According to a further embodiment example, the seat and the passage has substantially the same shape in a cross section at right angles to an axial direction of the filter.

The filter housing 105 has a cylindrical inner wall 162 with a circular cross section. The diameter of the circular cylindrical wall 162 is matched to the diameter of the filter material body 102 establishing a gap between them.

The filter housing 105 has a central upstanding, tubular portion 131 for receipt in the opening of the filter insert at a lower portion thereof extending from a bottom of the filter housing chamber. The tubular portion 131 is arranged to guide the filter insert to its correct operational position. Further, the sealing means is realized between the tubular portion 131 and the sealing 124 of the filter insert. The tubular portion 131 forms a fluid permeable central post. The central post 131 is grid-shaped. In the case the filter insert 100 has a fluid permeable central tubular structure 113, the post 131 and the structure 113 should be matched in design and/or rotational position for aligning the through holes allowing fluid through-flow.

The filter housing 105 comprises an inlet 166 for receipt of a raw fluid to be filtered, which empties into a raw side of the filter housing, and an outlet or return 168, which starts at a clean side of the filter housing, for filtered clean fluid. The inlet 166 and outlet 168 are provided in a lower region 170 of the filter housing 105. The inlet 166 and outlet 168 are in communication with different sides of the filter material body 102. More specifically, the outlet 16$ is provided in a bottom wall 153 of the filter housing and positioned radially centrally and adapted to match the position of the central opening in the tubular portion 131 so that it is in fluid communication with an interior side of the tubular portion 131. Further, the inlet 166 is positioned radially eccentric in the bottom wall 153 of the filter housing for distributing the fluid to a radially external side of the filter material body 102. The direction of the fluid inside the filter arrangement is disclosed in FIG. 13. By flowing through the filter material body 102, the liquid flows to the clean side of the filter housing (the radially interior space). The filtered liquid flows off through the outlet (return) 168. Dirt particles are retained in the filter material body 102.

Further, the filter housing 105 comprises a drainage means 142 in the form of a drainage valve in the lower region 170 of the filter housing 105 and specifically in the bottom wall 153 of the filter housing 105. The drainage means 142 is positioned radially eccentric in the bottom wall 153 of the filter housing and adapted to receive the drainage means actuating member 109 for blocking the valve. The filter housing 105 furthermore has a drain outlet 145 in fluid connection with a sump, through which an emptying of the filter housing is carried out in response to a replacement of the filter insert.

Figure 12:
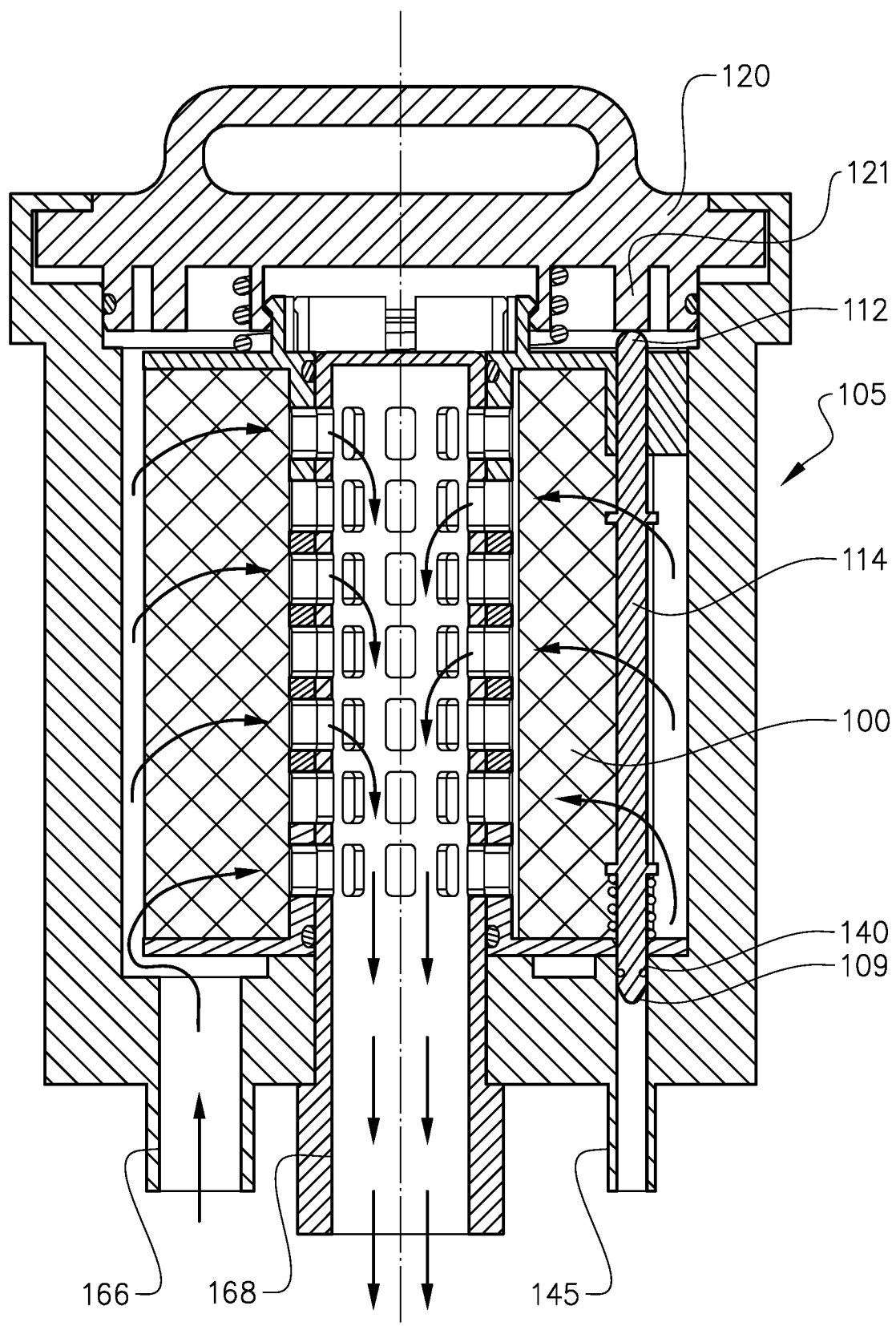
FIG. 12 is a partly cut cross sectional view of the filter arrangement according to FIG. 11 in an operational state.

FIG. 12 discloses a state where the filter insert 100 is in its operational position in the filter housing 105. The lid 120 is turned to its closed position relative to the filter housing 105 and the closing means 109 is consequently closing the drainage aperture 140 in the filter housing 105.

Figure 13:
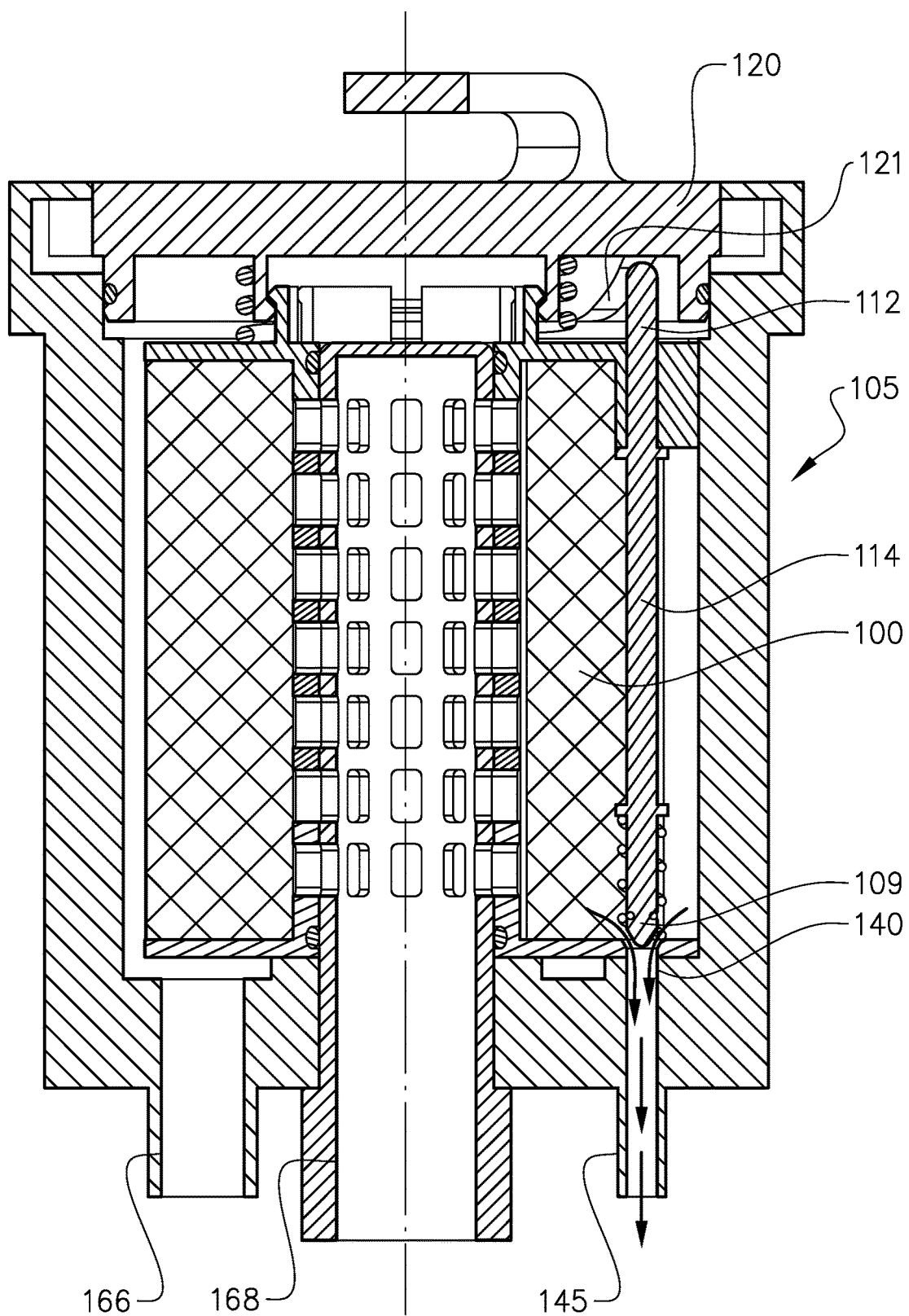
FIG. 13 shows the filter arrangement according to FIG. 12 in a non-operational state, FIG. 14-15 discloses a second embodiment example of the filter insert in a perspective view from the top and below, respectively, FIG. 16 discloses a second embodiment example of the filter arrangement comprising the filter insert according to FIG. 14-15 in an exploded view, FIG. 17 discloses a third embodiment example of the filter insert in a perspective view from the top, FIG. 18 discloses a third embodiment example of a filter arrangement comprising the filter insert according to FIG. 17 in a partly cut perspective view, FIG. 19-21 discloses filter insert according to the third embodiment example arranged in a filter housing in three consecutive steps during release of the filter insert, FIG. 22-23 discloses a fourth embodiment example of the filter insert in a perspective view from the top and below, respectively, FIG. 24 discloses the filter insert according to the fourth embodiment example in an exploded view, FIG. 25-25 are perspective views from the top and bottom, respectively, of a lid according to a second embodiment example.

FIG. 13 discloses a state where the lid 120 has been turned from its closed position relative to the filter housing 105 to an open position, thereby releasing the pressure from the actuation means 112 on top of the transfer member 114, wherein the spring member 115 pushes the transfer member 114 upwards so that the closing means 109 is withdrawn from the drainage aperture 140. The arrows show the flow of residual oil inside the housing through the opened drainage aperture 140.

During removal of the filter insert 100 from the filter housing 105, due to the engagement between the lid 120 and the filter insert 100 via the snap means 116,146, the filter insert 100 is also lifted and the blocking element 109 is thus lifted from the seat 140 on the drain outlet 145. In this manner, the drain outlet 145 is opened and the liquid located in the filter housing can flow off through the drain outlet, in the case of an oil filter, for example into the oil sump of a corresponding internal combustion engine. A mostly liquid-free filter insert 100 can then be removed from the filter housing 105.

Figure 14:
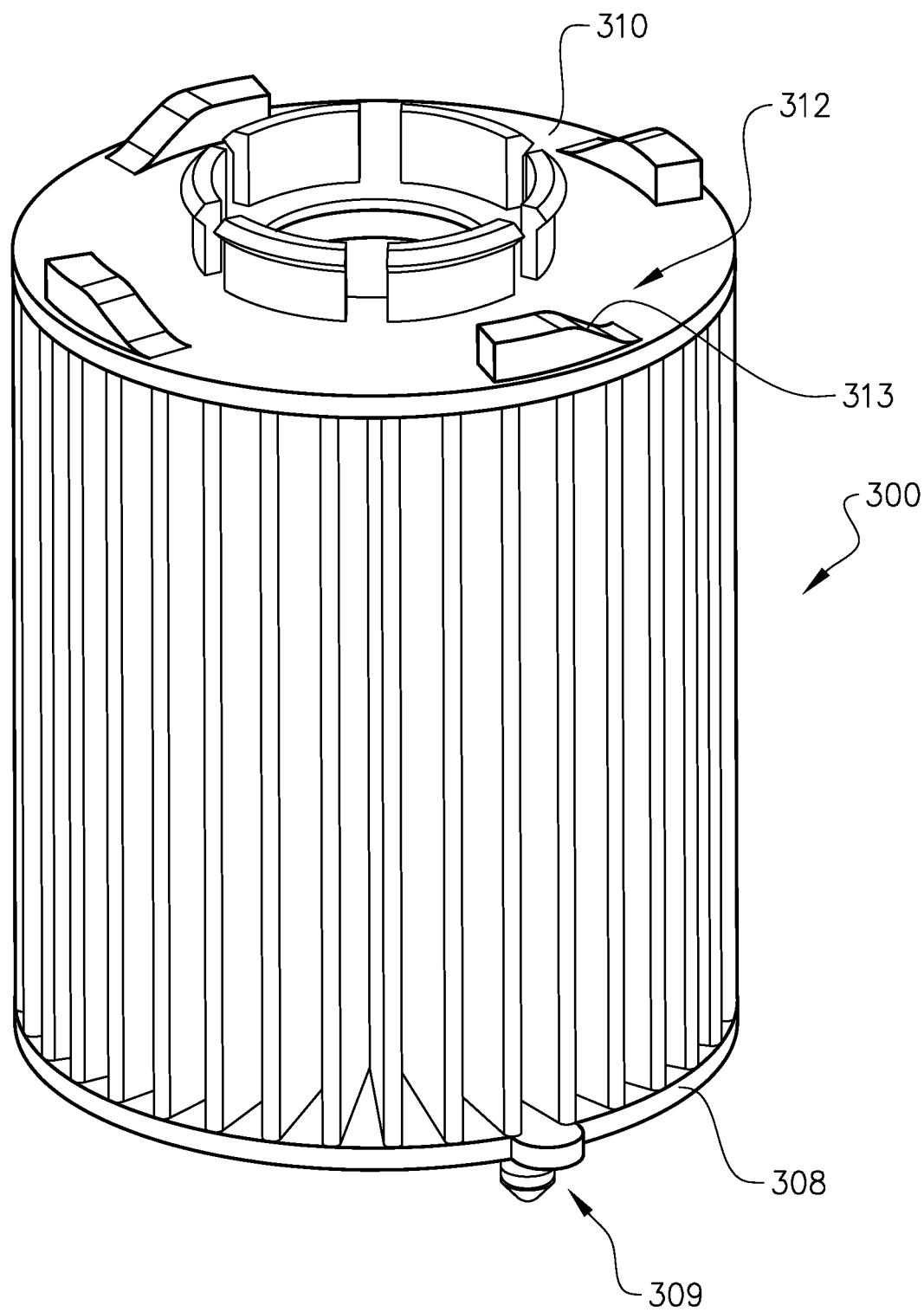
Figure 15:
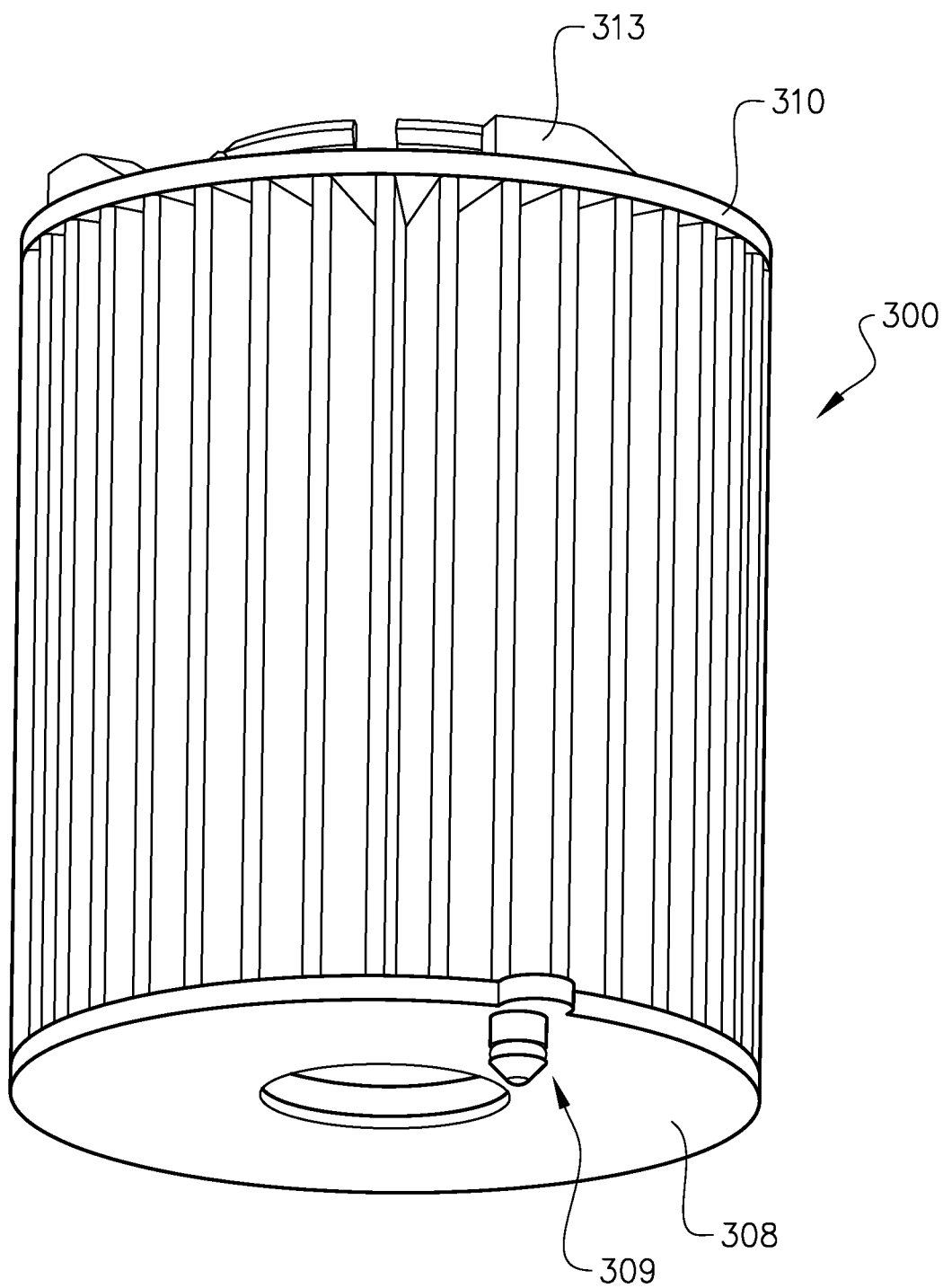

FIG. 14-15 discloses a second embodiment example of a filter insert 300 in similar views as in FIGS. 4-5. Only the main differences in relation to the first embodiment example will be described below. The filter insert 300 comprises an actuation means 312 for being actuated by corresponding contact means 121 of the lid 105. The actuation means 312 comprises an external contact surface 313 defining a projection. The contact surface 313 has a varying extension in an axial direction of the filter insert 300 along a circumferential direction of the filter insert. More specifically, the contact surface 313 forms a ramp extending in a circumferential direction of the filter insert 300. The ramp 313 starts in level with the upper surface of an upper panel 310 and extends to a plateau circumferentially spaced from the start. The actuation means 312 comprises a plurality of such circumferentially spaced ramps.

Further, the filter insert 300 comprises a closing means 309 rigidly attached to the lower panel 308 and projecting axially from a lower surface of the panel. The closing means 309 is formed in a one-piece unit with the lower panel 308. Further, the closing means 309 is formed by an eccentric drainage member. The eccentric drainage member is formed by a body with a substantially circular cross section and a sealing ring in a similar fashion as the closing means in the first embodiment example of the filter insert.

Figure 16:
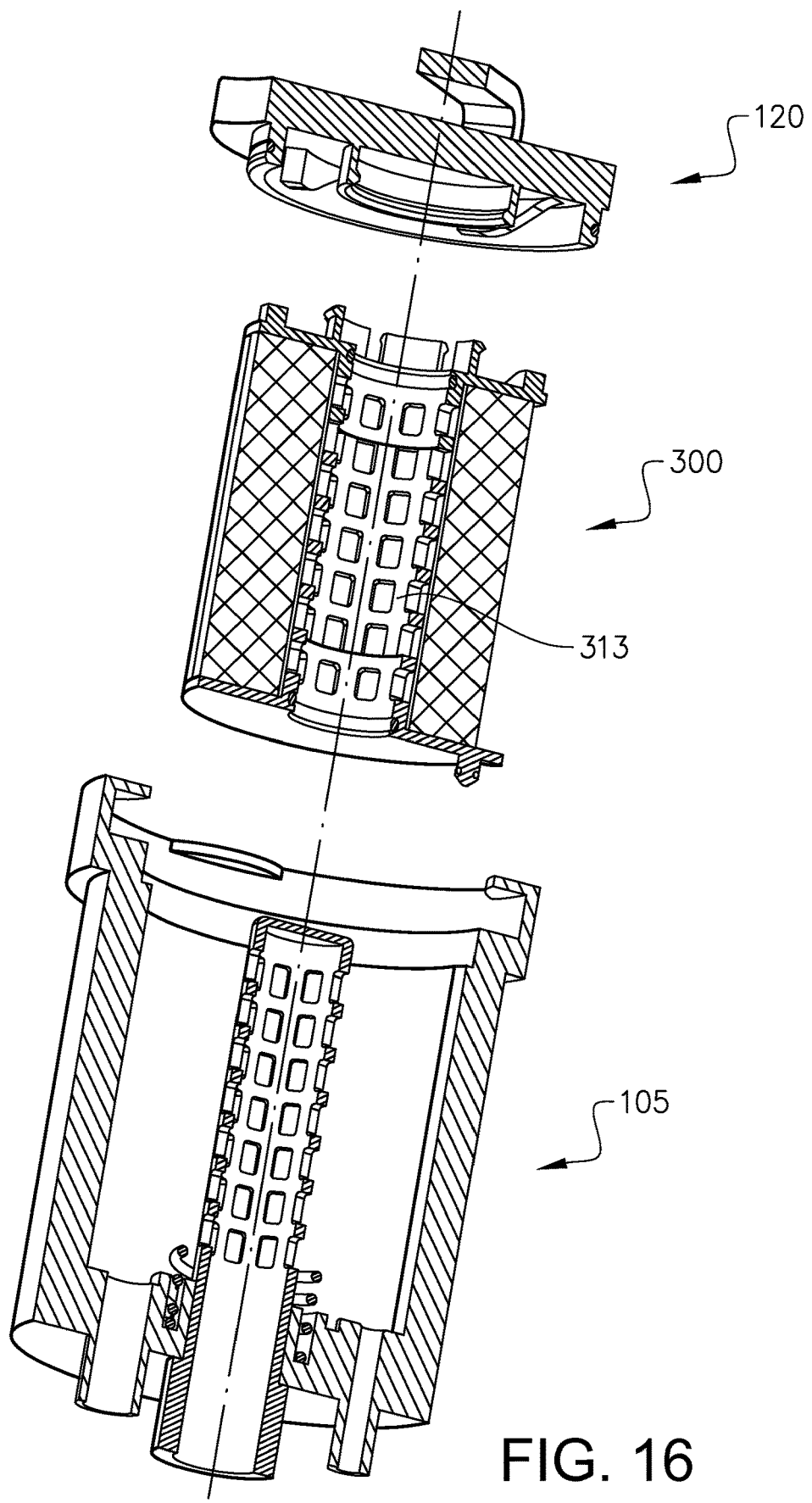

FIG. 16 is an exploded view of a filter arrangement according to a second embodiment example comprising the lid according to the first embodiment example, the filter insert according to the second embodiment examples and filter housing according to the first embodiment example.

Figure 17:
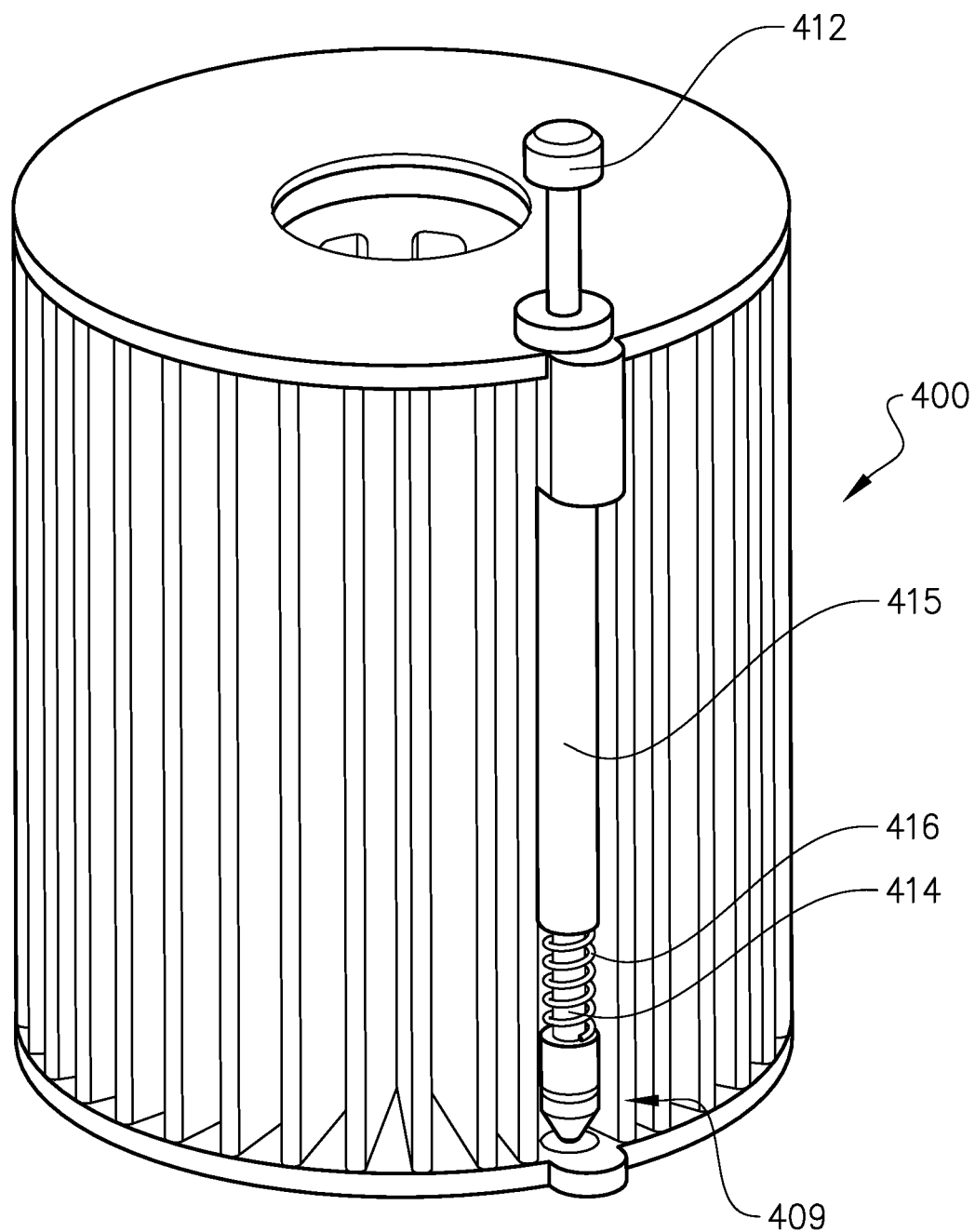

FIG. 17 discloses a third embodiment example of a filter insert 400 in a perspective view from the top, similar to FIG. 4. Only the main differences in relation to the first embodiment example will be described below. The filter insert 400 comprises a push rod with a functionality similar to an inc pen for operating the draining function. The filter insert 400 comprises an actuation means 412 arranged at the upper end of a transfer member 414, which actuation means 412 is accessible for external contact and manoeuvring from the top. The filter insert 400 further comprises a closing means 409 arranged at the lower end of the transfer member for closing the drainage aperture 140 in the housing 105. The filter insert 400 further comprises a stationary tubular member 415 extending in parallel with an axial direction of the filter insert 400. The transfer member 414 is movably received in the stationary tubular member 415 and adapted for movement in its longitudinal direction between two end positions. The closing means 409 is spring-biased via a spring 416.

Figure 19:
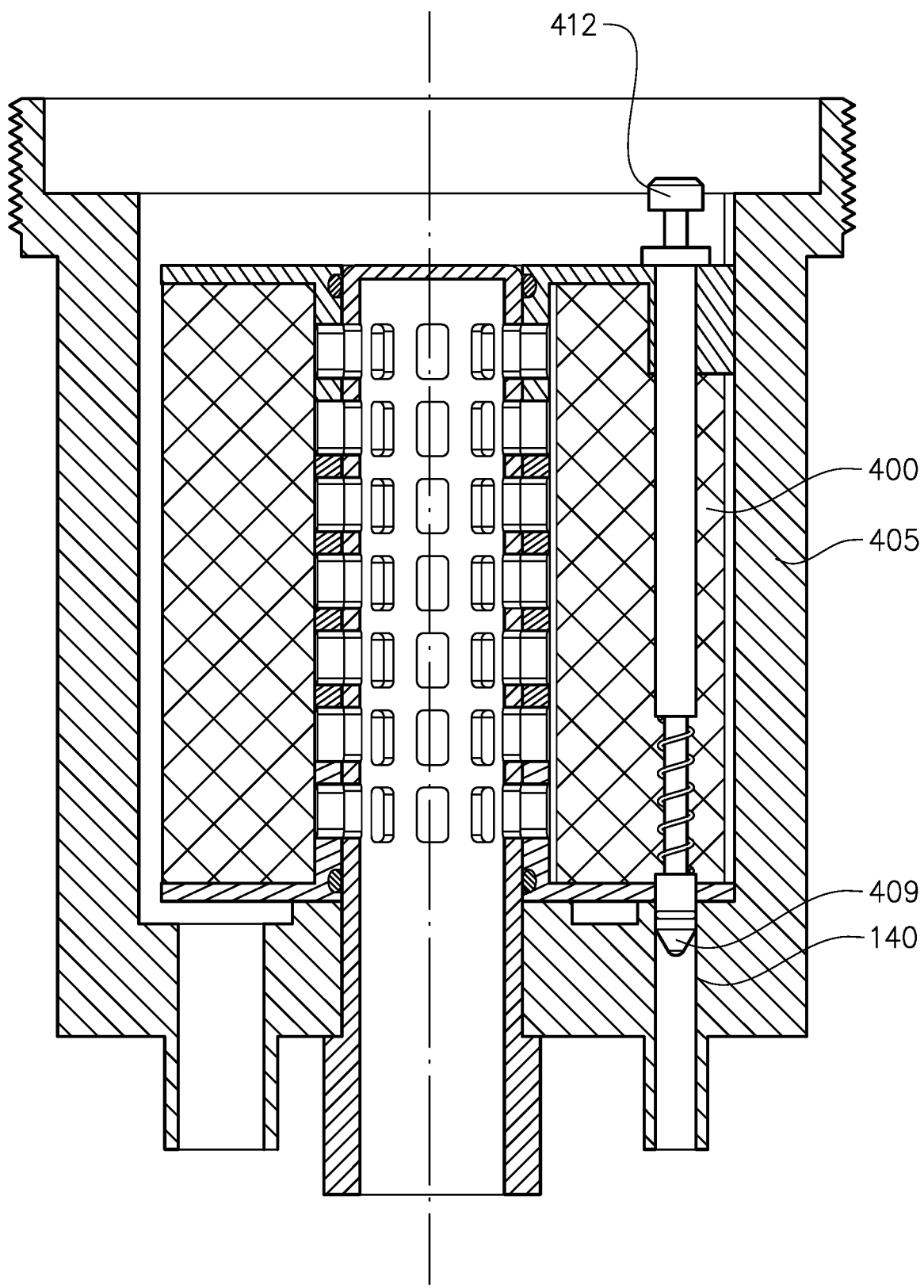
Figure 21:
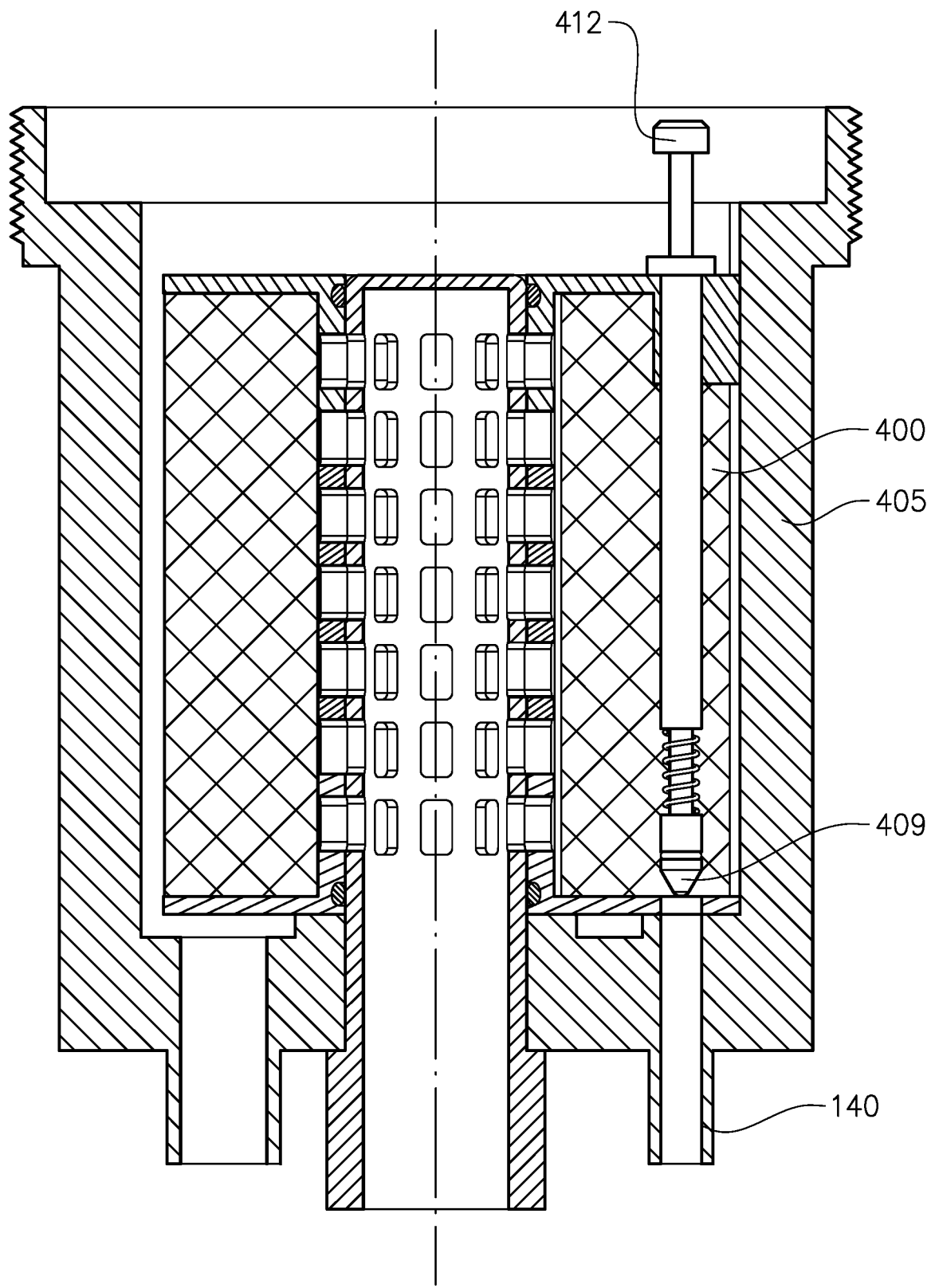

The filter insert 400 is adapted for releasably latching the closing means 409 in a retracted end position, see FIG. 21, and in a projected end position, see FIG. 19.

Figure 18:
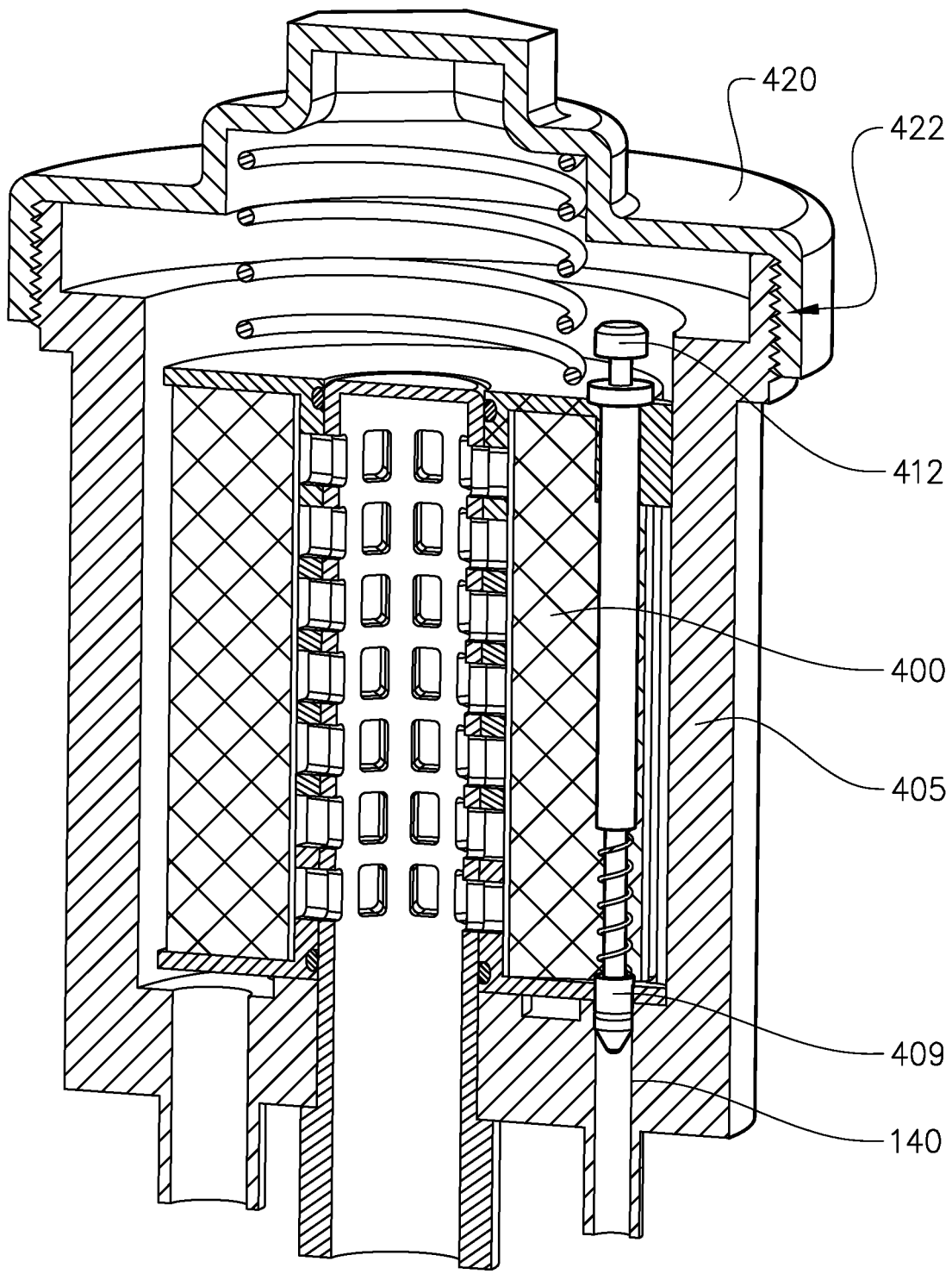

FIG. 18 shows the filter insert 400 arranged in an operative position in a housing 405, wherein a lid 420 is positioned to close an access opening of the housing for the filter insert 400. The housing 405 and the lid 420 have complimentary shaped engagement means 422 for attaching the lid to the housing. The engagement means 422 is formed by a threaded connection.

Figure 20:
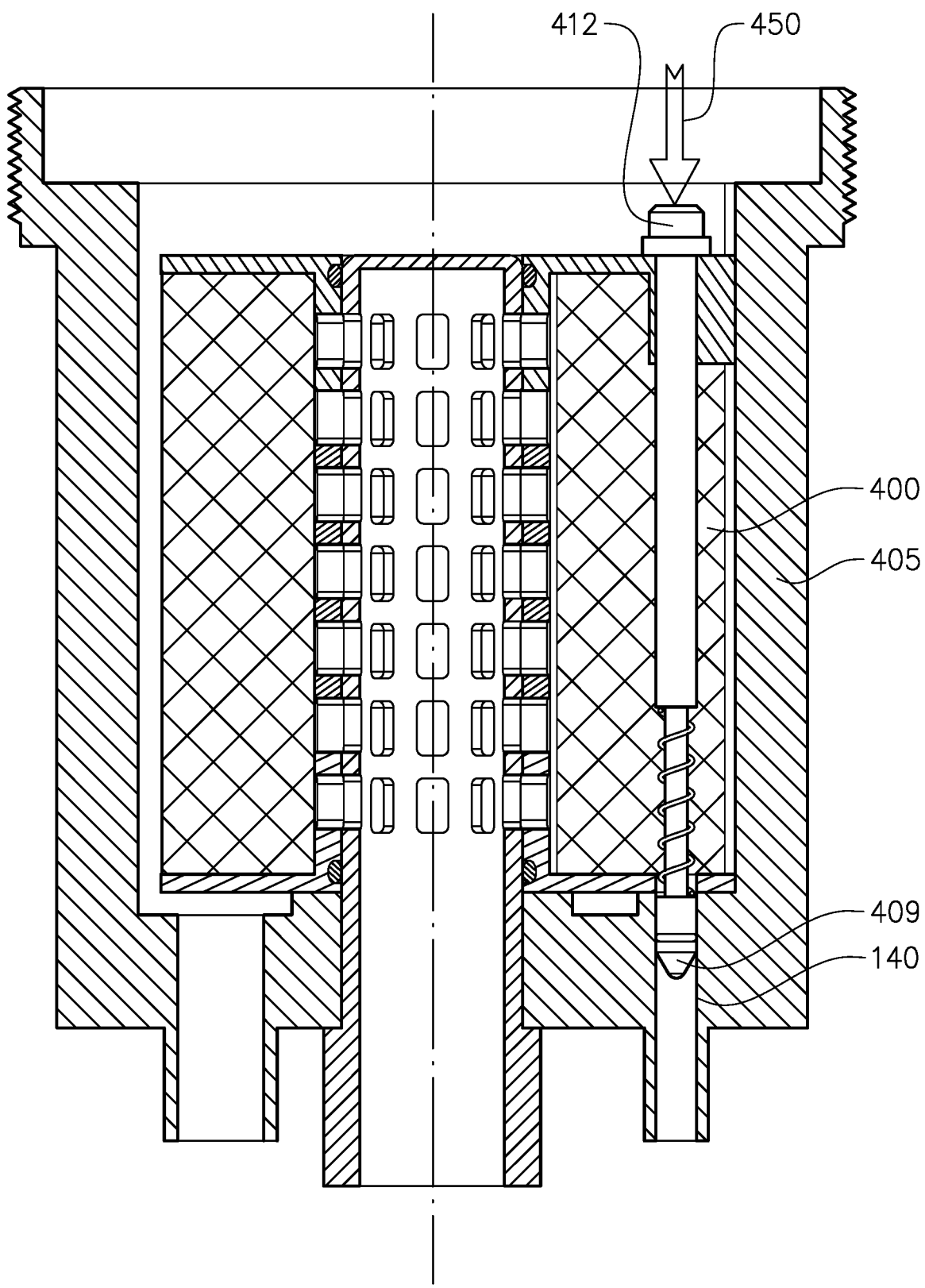

FIG. 19-21 show three positions of the inc pen type of push rod for draining remaining oil in the housing before a used filter insert 400 is removed from the housing 405. FIG. 19 shows a first end position of the closing means 409 safely received a first distance into the draining aperture 180. In FIG. 20, the actuation means 412 is pushed downwards by hand, wherein the closing means 409 is moved downwards to a projected intermediate position a second distance into the draining aperture 140. The closing means 409 will only be positioned in this intermediate position as long as there is a force established from above, see arrow 450. In FIG. 21, the actuation means 812 is released, wherein the closing means 409 is moved upwards to its retracted end position outside of the draining, aperture 140, wherein any remaining oil in the housing can be drained via the drainage aperture 140.

According to one alternative to the embodiment example in FIGS. 17-21, the housing and the lid may designed with a different type of complimentary engagement means than the threaded connection, such as a bayonet catch connection. According to a further alternative to the embodiment example in FIGS. 17-21 and described above, the lid may be adapted for actuating the actuation means 412 for operating the closing means 409 automatically during engagement and disengagement, respectively, relative to the housing. According to a further alternative, the housing and the lid may designed with a similar type of connection as has been described above with regard to the first embodiment example, see FIGS. 1-12.

Figure 22:
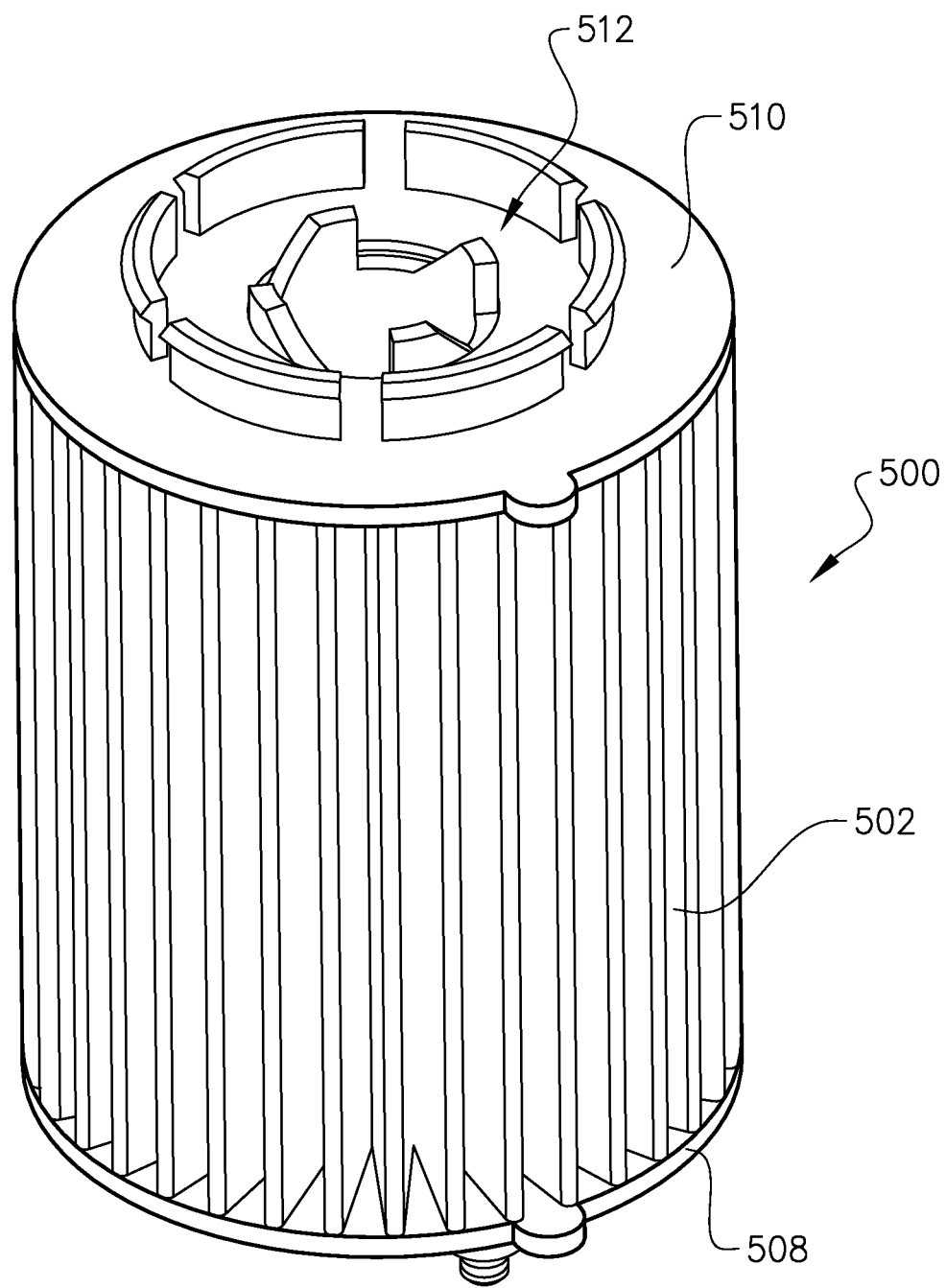
Figure 23:
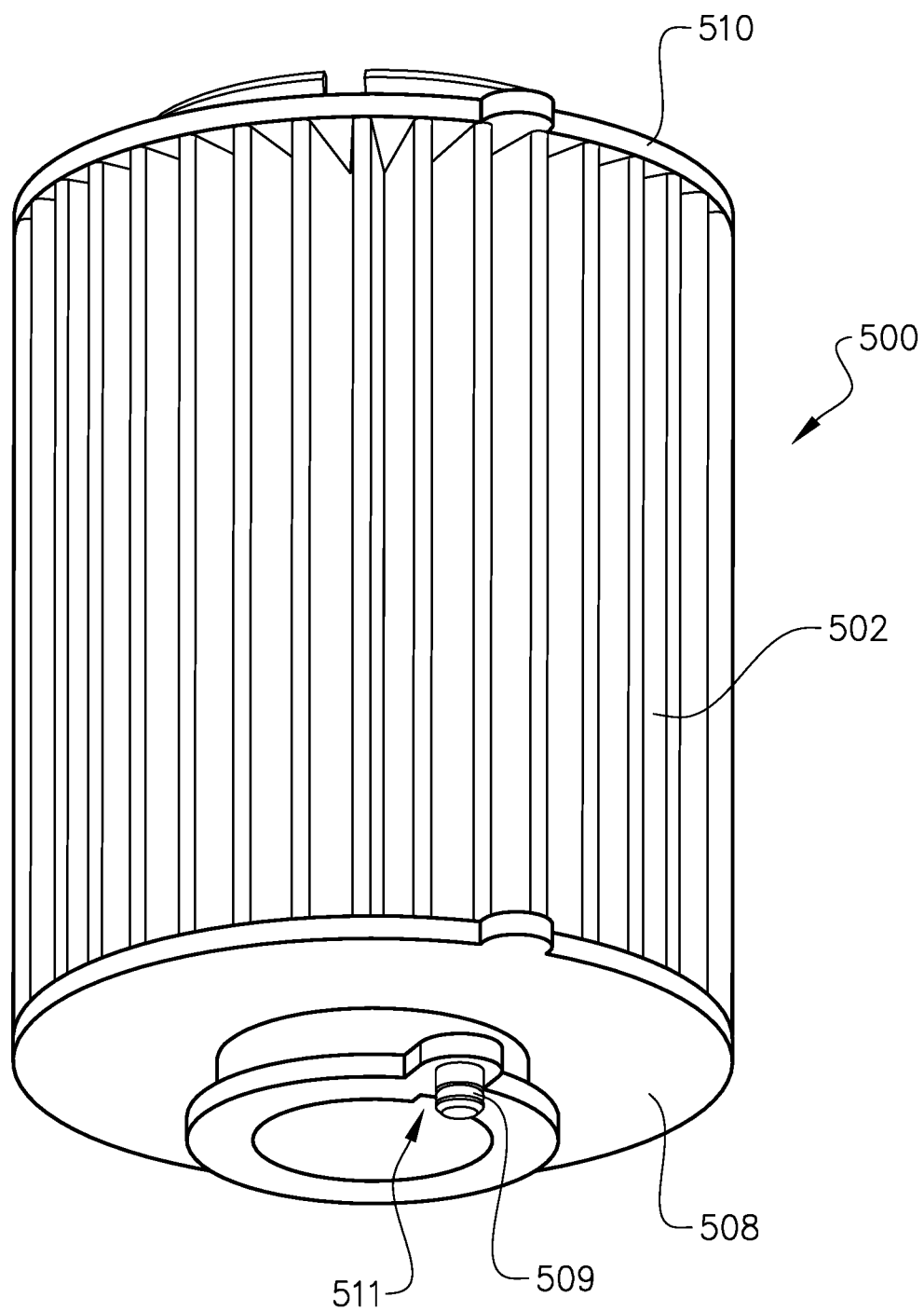
Figure 24:
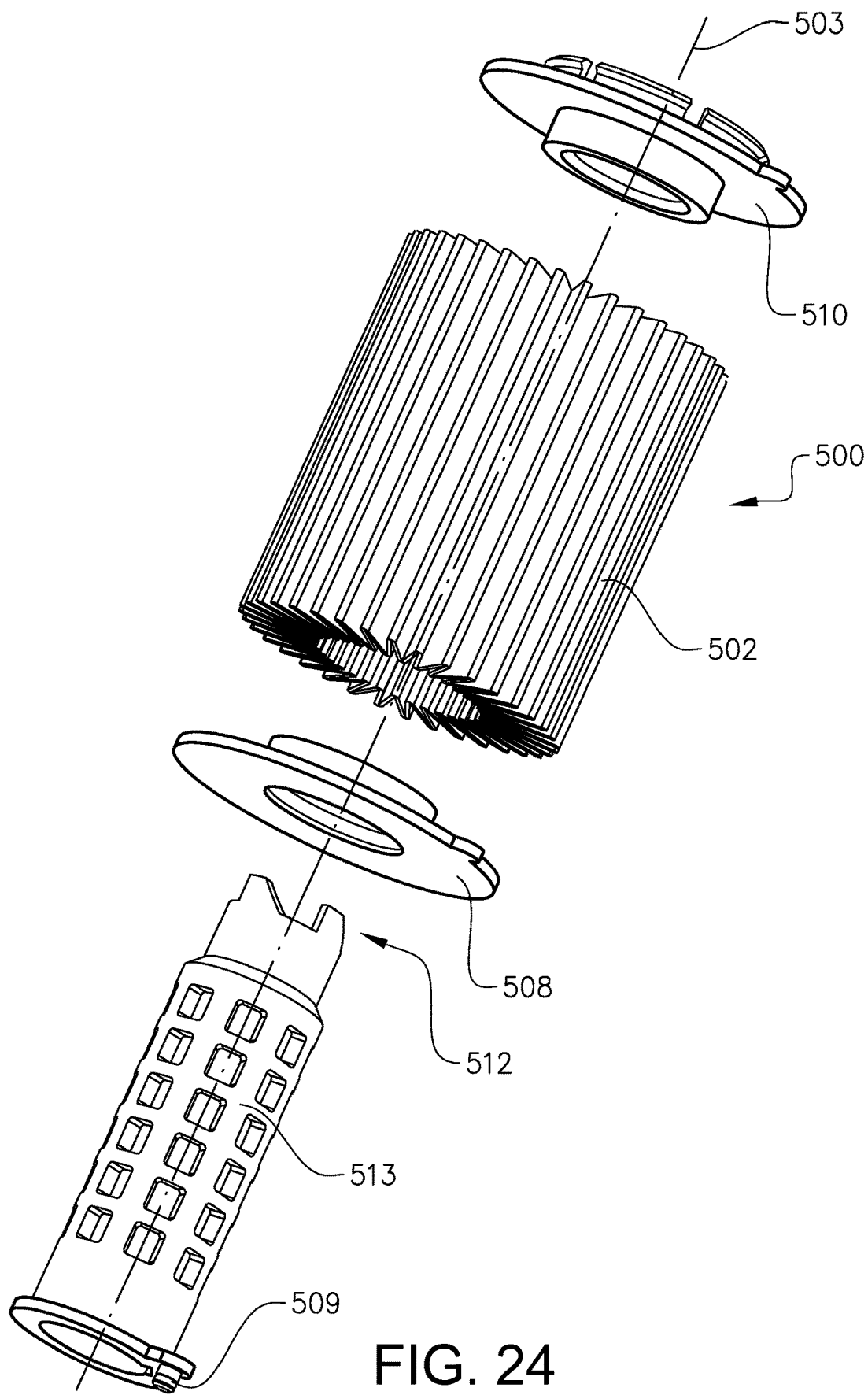

FIG. 22-23 disclose a fourth embodiment example of a filter insert 500 in a perspective view from the top and below, respectively, similar to FIGS. 4-5. Only the main differences in relation to the first embodiment example will be described below. The filter insert 500 comprises a lower end panel 508 and an upper end panel 510 and an axially moveably arranged contra/tubular structure 513, see FIG. 24. The closing means 509 is rigidly attached to a lower end of the central tubular structure 513. Further, the filter insert 500 comprises an actuation means 512 rigidly attached to an upper end of the entral tubular structure 513. The actuation means 512 is accessible from above the filter insert 500.

The central tubular structure 513 is axially moveably arranged inside of the hollow filter insert 500. More specifically, central tubular structure 513 is axially slidingly arranged inside of the openings in the end panels. The actuation means 512 is formed by an element projecting inthe axial direction and having a circumferential extension, wherein a contact surface has a continuously increasing extension in the axial direction from a first end to a second end forming a plateau. In other words, the actuation means 512 forms a ramp adapted for a gliding interaction with the contact means of the lid.

Figure 28:
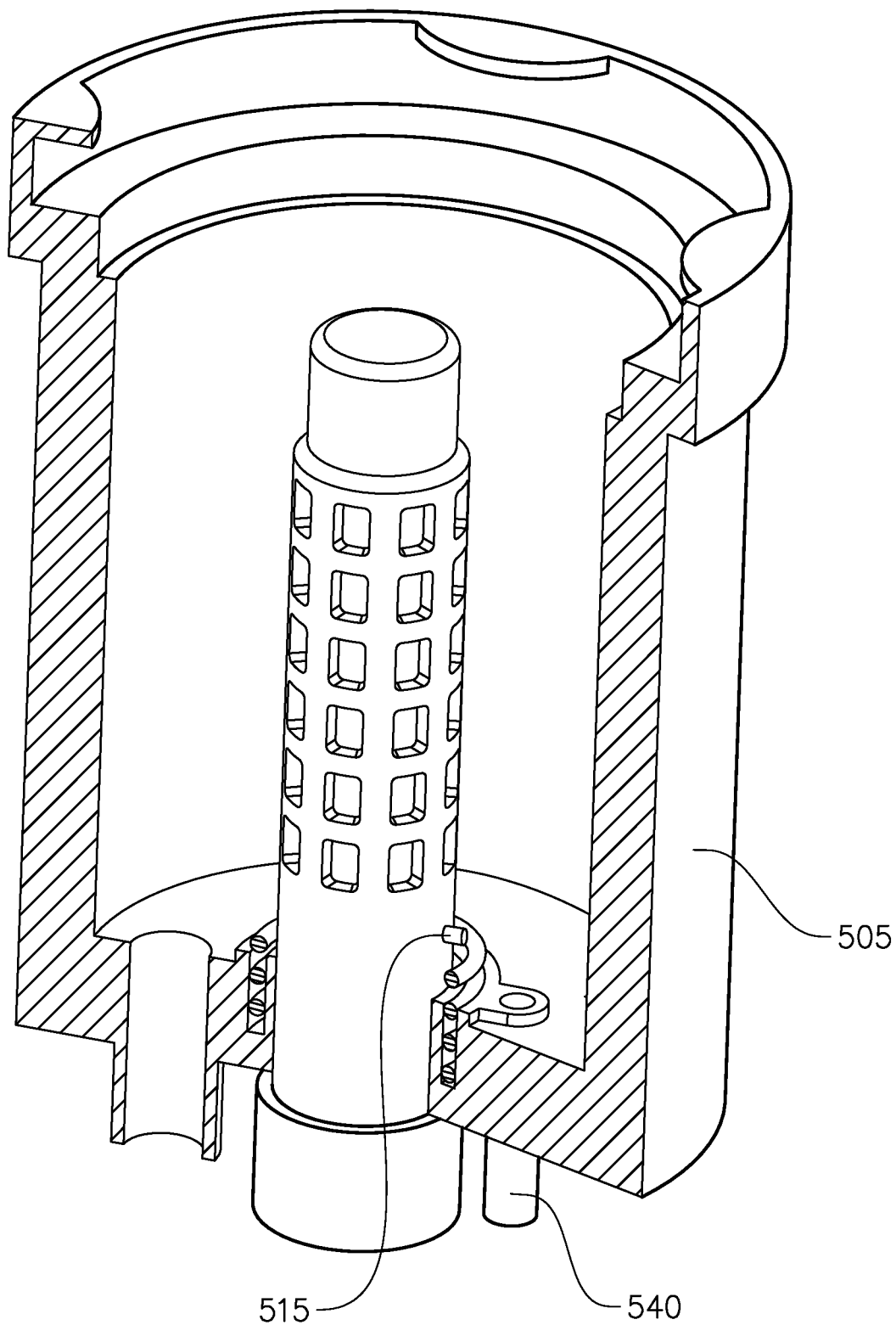

The central tubular structure 513 comprises a positioning means 511 for engagement with a complimentary shaped positioning means 515 of the housing 505, see FIG. 28, for positioning the structure 513 in a circumferential direction so that the closing means 509 ends up in line with the drainage aperture 540. The positioning means 511 is in the form of a radial recess. The positioning means 511 is provided at an end portion of the tubular structure 513 and more specifically in the vicinity of the closing means 509. The positioning means 515 in the housing is in the form of a radial projection in the form of a pin.

Figure 25:
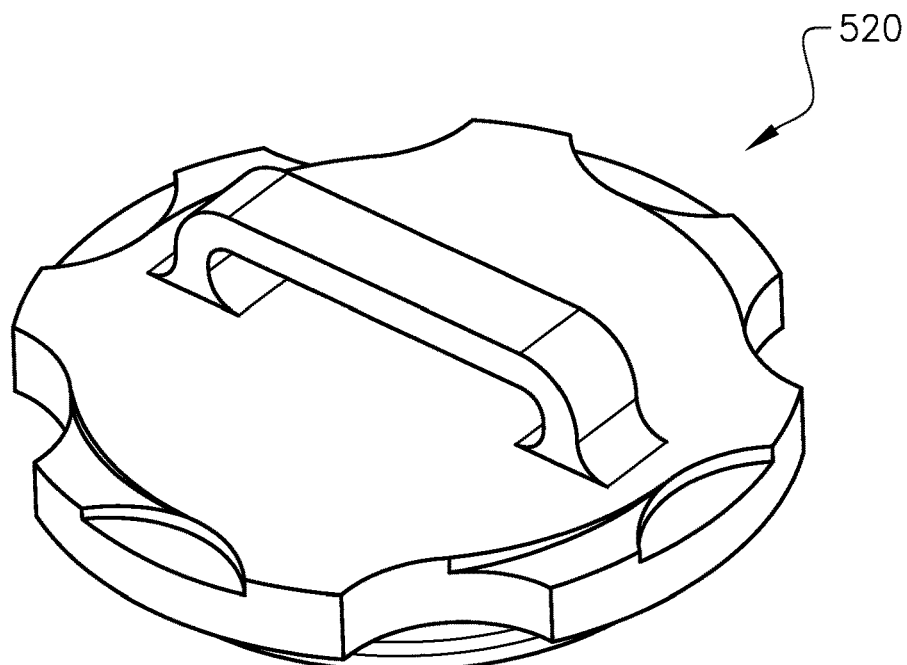
Figure 26:
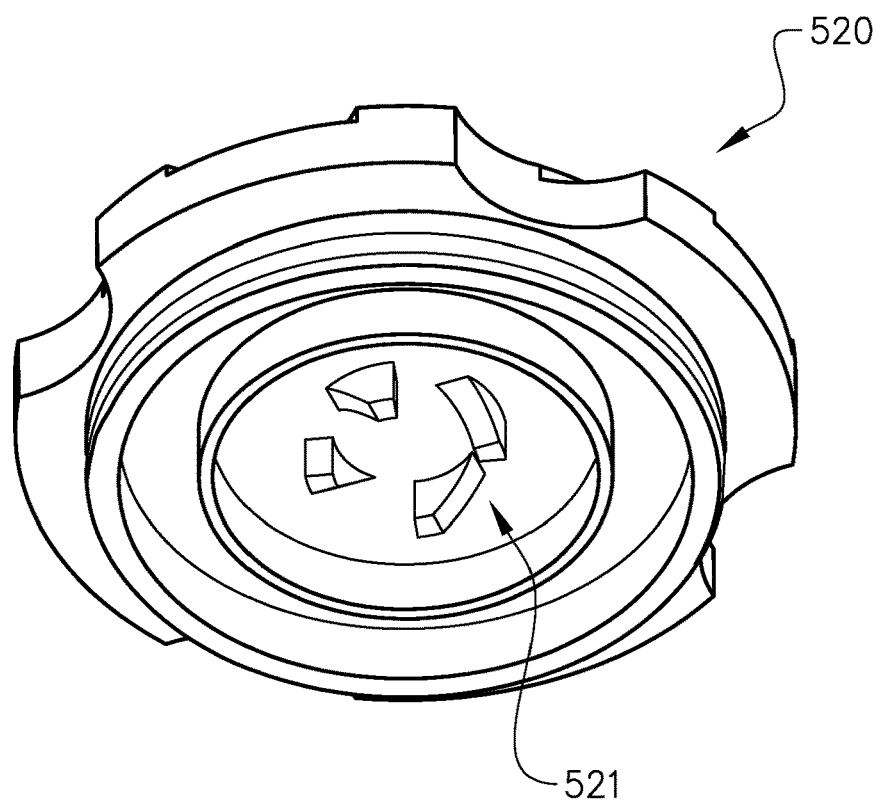

FIG. 25-26 discloses a second embodiment example of a lid 520 in a perspective view from the top and below, respectively, similar to FIGS. 7-8. Only the main differences in relation to the first embodiment example will be described below. The lid 520 comprises means 521 for contacting the actuation means 512 of the filter insert 500 so that the closing means 509 is actuated during engagement of the lid with the filter housing. The contact means 521 comprises a ramp structure similar to the one shown in FIGS. 7-8, however positioned closer to a central axis of the lid.

Figure 27:
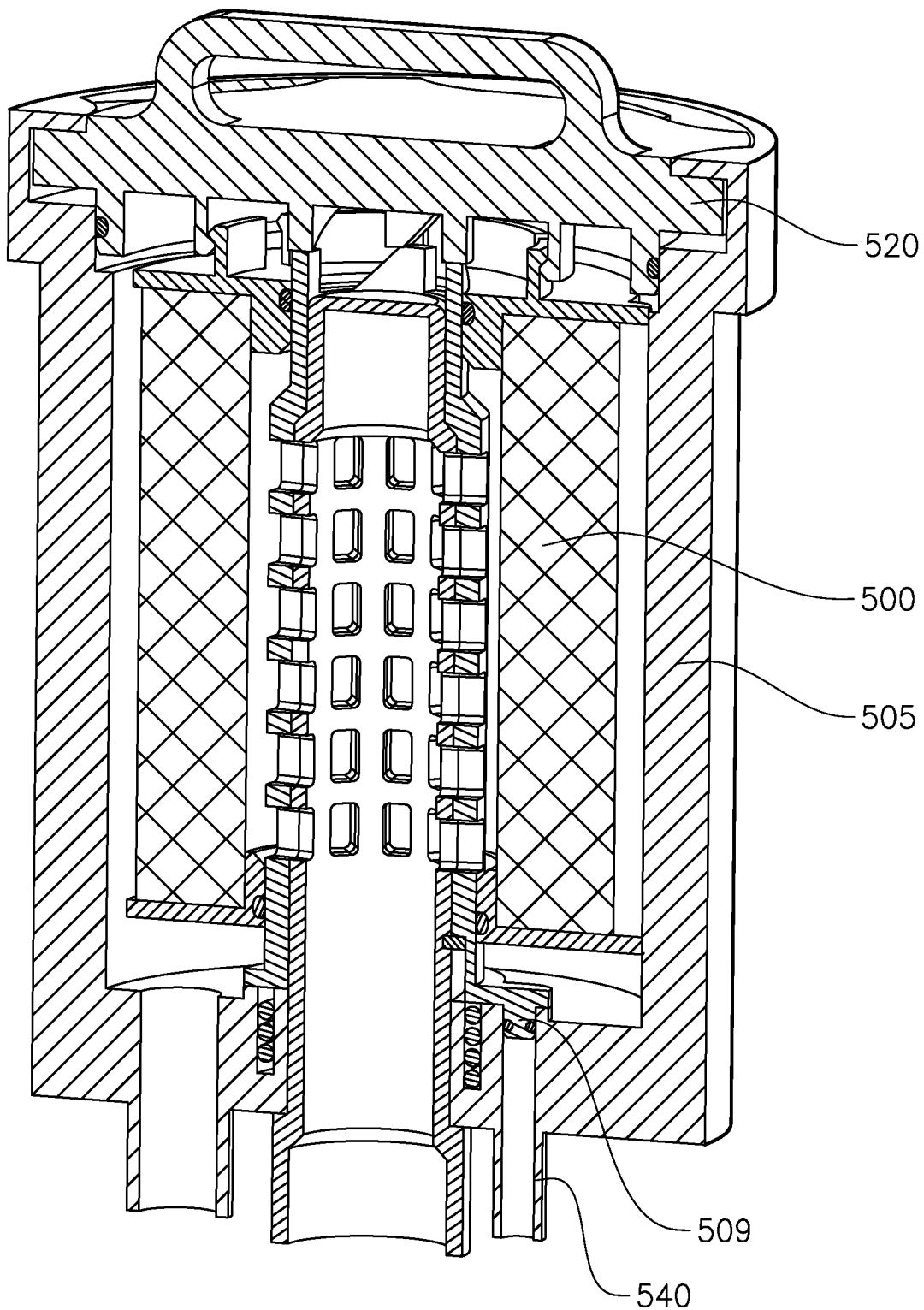
FIG. 27 is a partly cut cross sectional view of a filter arrangement according to a fourth embodiment example in an operational state, FIG. 28 discloses a third embodiment example of the filter housing in a partly cut perspective view.

FIG. 27 discloses a fourth embodiment example of a filter arrangement in a partly cut perspective view. The filter arrangement comprises the filter insert 500 and the lid 520 and a housing 505, see also FIGS. 28 and 29. Only the main differences in relation to the first embodiment example will be described below. The housing 505 has a drainage aperture 540 still eccentric, but more centrally positioned than in the first embodiment example, for receipt of the closing means 509.

Figure 29:
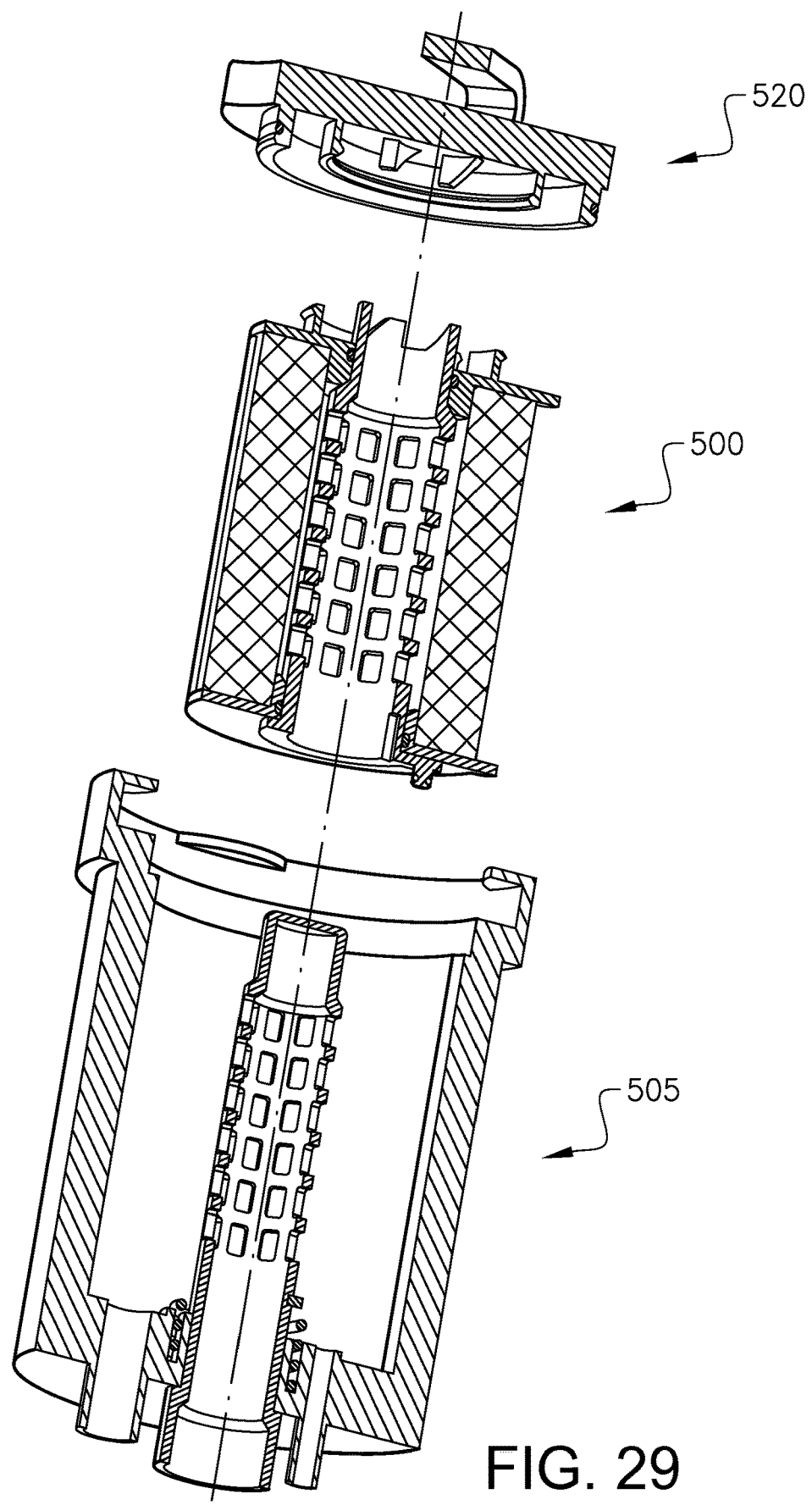
FIG. 29 is an exploded view of a filter arrangement according to a fifth embodiment example comprising the filter insert, lid and filter housing according to FIGS. 22-28, and FIG. 30-31 discloses the filter arrangement according to FIG. 29 in two different operational positions.

FIG. 28 discloses a third embodiment example of the filter housing in a partly cut perspective view. FIG. 29 is an exploded view of a filter arrangement according to a fifth embodiment example comprising the filter insert, lid and filter housing according to FIGS. 22-27.

Figure 30:
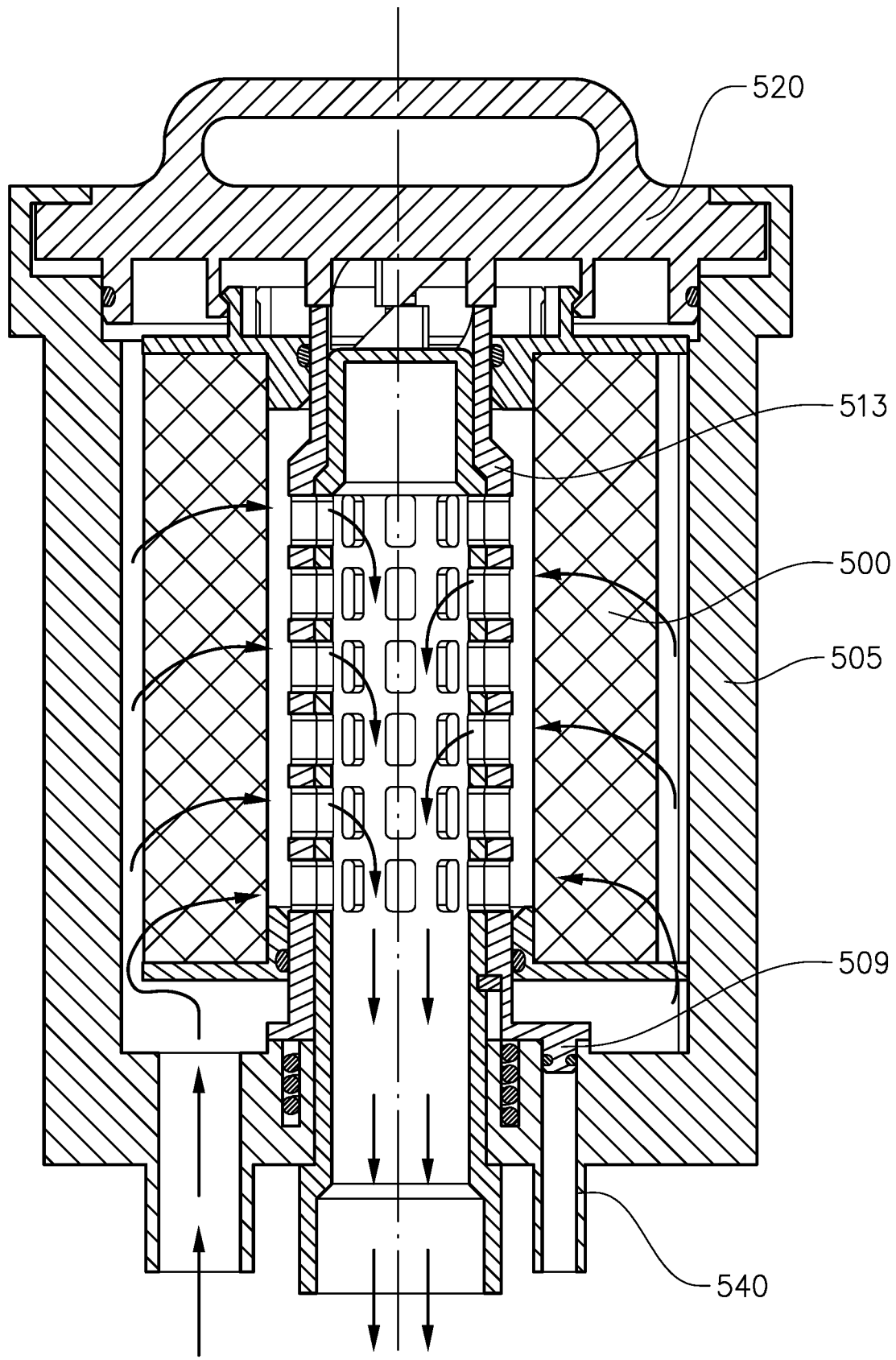
Figure 31:
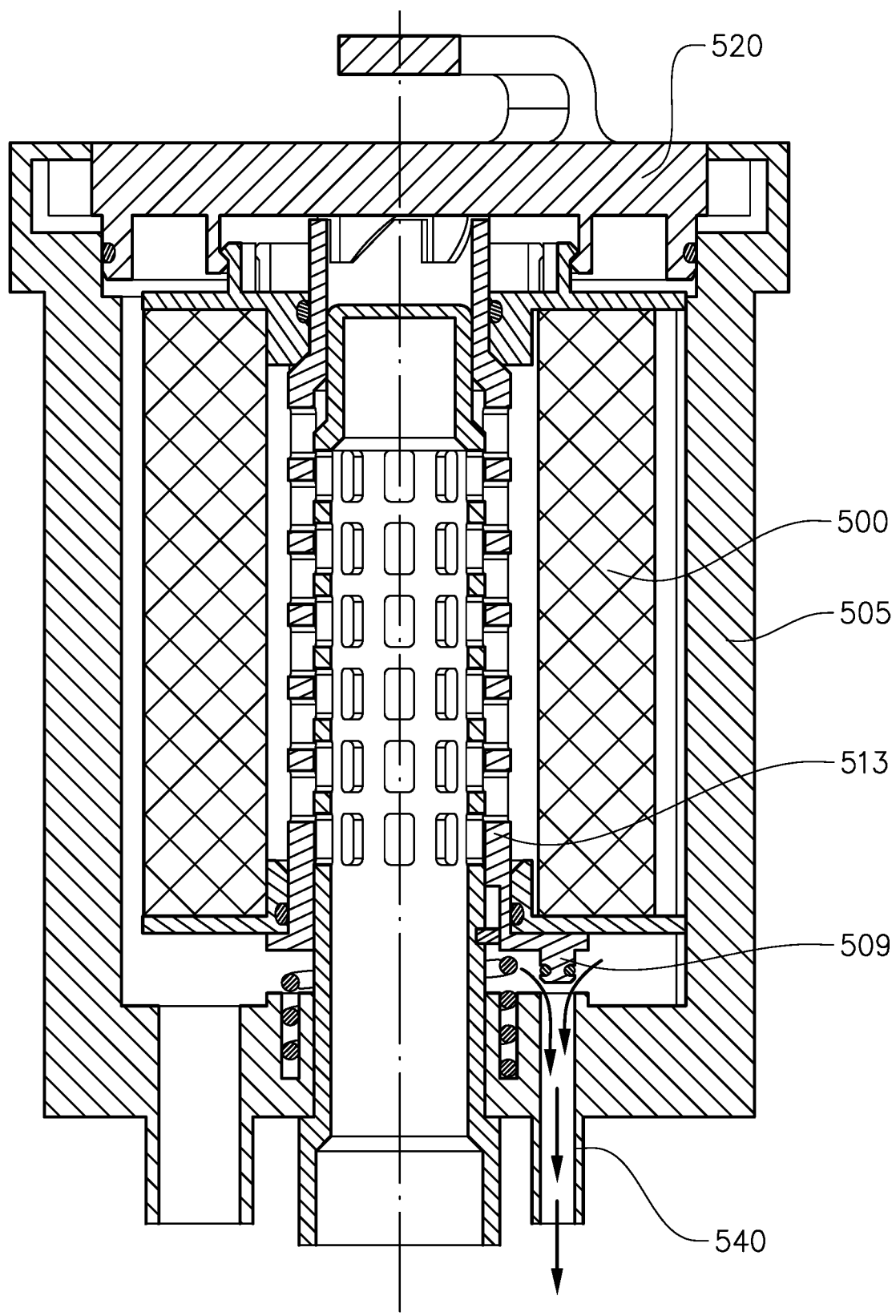

FIG. 30 shows the filter insert 500 in an operative position in the housing 505, wherein the closing means 509 is arranged in the drainage aperture 540 and sealingly closing it. The lid 520 is attached to the housing in an operative position, pushing the central tubular structure 543 downwards.

It is to be understood that the present invention is not limited to the embodiments described above and illustrated in the drawings; rather, the skilled person will recognize that many changes and modifications may be made within the scope of the appended claims.

According to an alternative, the closing means may not be formed by a body surrounded by a sealing ring to be pushed into a correspondingly shaped aperture, but instead a flexible sheet, like a rubber mat may be pushed to the drainage hole with help of a push rod with a rounded tip. Further, the closing means may alternatively be provided in other material as cork or silicone, as a softer "plug" to close the drainage hole. The drainage closing means may be formed by a circular peg.

The invention claimed is:

1. A filter insert for being removably arranged in a filter housing, wherein the filter insert defines a first end and a second end opposite the first end, comprising
a closing means at the first end of the filter insert for controlling opening and closing, respectively, of an aperture, wherein
the filter insert includes an actuation means connected to the filter insert so as to form a part of the filter insert, the actuation means being operatively connected to the closing means for actuating the closing means, wherein the actuation means is positioned at the second end of the filter insert and wherein the actuation means is accessible for external contact at the second end of the filter insert, wherein
the filter insert comprises a filter material body, and wherein the filter insert comprises a filter material body support structure at the second end of the filter insert, wherein the filter material body support structure has a main extension in a direction transverse to an axial direction of the filter insert, wherein the actuation means is moveably arranged in relation to the filter material body support structure at the second end of the filter insert, wherein the filter material body support structure includes a first and a second filter material body support structure, and the filter insert includes a spring member biasing the actuation means to project from the second filter material body support structure.

2. A filter insert according to claim 1, wherein the actuation means comprises an external contact surface defining a projection or recess.

3. A filter insert according to claim 2, wherein the projection or recess forms part of a structure with varying extension in an axial direction of the filter along a circumferential direction of the filter insert.

4. A filter insert according to claim 1, wherein the actuation means is eccentrically positioned at the second end of the filter insert.

5. A filter insert according to claim 1, wherein the closing means is eccentrically positioned at the first end of the filter insert.

6. A filter insert according to claim 4, wherein the closing means is eccentrically positioned at the first end of the filter insert, and the eccentric position of the closing means at the first end of the filter insert and the eccentric position of the actuation means at the second end of the filter insert overlap in an axial direction of the filter insert.

7. A filter insert according to claim 1, wherein the filter insert comprises a transfer member extending between the first end and the second end of the filter insert, and being movably arranged for transferring a movement between the actuation means and the closing means.

8. A filter insert according to claim 7, wherein the transfer member is movably arranged in relation to the filter material body.

9. A filter insert according to claim 7, wherein the transfer member is rigid.

10. A filter insert according to claim 7, wherein the transfer member is straight.

11. A filter insert according to claim 7, wherein the transfer member is formed by an elongated element.

12. A filter insert according to claim 11, wherein the actuation means is formed in a one-piece unit with the transfer member.

13. A filter insert according to claim 11 wherein the closing means is formed in a one-piece unit with the transfer member.

14. A filter insert according to claim 7, wherein the transfer member is arranged eccentrically with regard to a center axis of the filter insert.

15. A filter insert according to claim 7, wherein the transfer member is arranged concentrically with regard to a center axis if the filter insert.

16. A filter insert according to claim 1, wherein the filter insert comprises a first end filter material body support structure at the first end, wherein the first end filter material body support structure has a main extension in a direction transverse to an axial direction of the filter insert.

17. A filter insert according to claim 16, wherein at least one of the first end material body support structure and a second end filter material body support structure has a plate shaped structure.

18. A filter insert according to claim 16, wherein the closing means moveably arranged in relation to the first end filter material body support structure at the first end of the filter insert.

19. A filter insert according to claim 18, wherein the closing means is arranged to project from the first filter material body support structure.

20. A filter insert according to claim 1, wherein the closing means forms a drainage valve actuating means.

21. A filter insert according to claim 1, wherein the filter insert is adapted for filtering a fluid for an internal combustion engine.

22. A filter insert according to claim 1, wherein the actuation means projects beyond a surface of the second filter material body support structure.

* * * * *